US010147425B2

(12) United States Patent
Yang

(10) Patent No.: US 10,147,425 B2
(45) Date of Patent: Dec. 4, 2018

(54) ELECTRONIC DEVICES HAVING SPEECH RECOGNITION FUNCTIONALITY AND OPERATING METHODS OF ELECTRONIC DEVICES

(71) Applicant: Samsung Electronics Co., Ltd., Suwon-si, Gyeonggi-do (KR)

(72) Inventor: Seung-soo Yang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/491,600

(22) Filed: Apr. 19, 2017

(65) Prior Publication Data

US 2017/0345422 A1 Nov. 30, 2017

(30) Foreign Application Priority Data

May 24, 2016 (KR) .................. 10-2016-0063728

(51) Int. Cl.
*G10L 15/22* (2006.01)
*G06F 3/16* (2006.01)
(52) U.S. Cl.
CPC ............. *G10L 15/22* (2013.01); *G06F 3/167* (2013.01); *G10L 2015/223* (2013.01); *G10L 2015/228* (2013.01)
(58) Field of Classification Search
CPC ................................................... G10L 15/22
See application file for complete search history.

(56) References Cited

U.S. PATENT DOCUMENTS

| 7,085,554 B2 | 8/2006 | Picard et al. |
| 7,496,509 B2 | 2/2009 | Navratil et al. |
| 8,954,330 B2 | 2/2015 | Koenig et al. |
| 9,632,748 B2* | 4/2017 | Faaborg ............ G06F 3/167 |
| 9,812,128 B2* | 11/2017 | Mixter .............. G10L 15/22 |
| 2005/0149331 A1 | 7/2005 | Ehrlich |
| 2013/0204622 A1 | 8/2013 | Lu et al. |
| 2013/0238326 A1* | 9/2013 | Kim .................. G06F 3/167 704/231 |
| 2014/0163976 A1* | 6/2014 | Park ................. G10L 15/00 704/231 |
| 2015/0088518 A1 | 3/2015 | Kim et al. |
| 2015/0112684 A1 | 4/2015 | Scheffer et al. |
| 2015/0264439 A1* | 9/2015 | Karlin ........... H04N 21/42202 725/12 |

(Continued)

FOREIGN PATENT DOCUMENTS

| CN | 1603734 A | 4/2005 |
| JP | H02119326 A | 5/1990 |

(Continued)

*Primary Examiner* — Douglas Godbold
(74) *Attorney, Agent, or Firm* — Harness, Dickey & Pierce, P.L.C.

(57) ABSTRACT

Disclosed are electronic devices having speech recognition functionality and operating methods of the electronic devices. Operating methods may include selectively activating or deactivating speech recognition functionality of one or more electronic devices based on comparing priorities associated with the electronic devices, respectively. Speech recognition functionality of one or more devices may be controlled based on transmitting an activation or deactivation command to the one or more devices.

16 Claims, 21 Drawing Sheets

(56) References Cited

U.S. PATENT DOCUMENTS

| | | | |
|---|---|---|---|
| 2015/0370531 A1* | 12/2015 | Faaborg | G06F 3/167 |
| | | | 704/275 |
| 2015/0371638 A1* | 12/2015 | Ma | G10L 15/065 |
| | | | 704/275 |
| 2016/0005404 A1* | 1/2016 | Yokoya | H04N 21/233 |
| | | | 704/275 |
| 2017/0025124 A1* | 1/2017 | Mixter | G10L 15/32 |
| 2017/0076720 A1* | 3/2017 | Gopalan | G06F 3/167 |
| 2017/0357478 A1* | 12/2017 | Piersol | G06F 3/167 |

FOREIGN PATENT DOCUMENTS

| | | |
|---|---|---|
| JP | 2662825 B2 | 10/1997 |
| KR | 20140106715 A | 9/2014 |

\* cited by examiner

ELECTRONIC DEVICES HAVING SPEECH RECOGNITION FUNCTIONALITY AND OPERATING METHODS OF ELECTRONIC DEVICES

CROSS-REFERENCE TO RELATED APPLICATIONS

This application claims the benefit of Korean Patent Application No. 10-2016-0063728, filed on May 24, 2016, in the Korean Intellectual Property Office, the disclosure of which is incorporated herein in its entirety by reference.

BACKGROUND

The inventive concepts relate to electronic devices having a speech recognition function and methods of controlling speech recognition functions of electronic devices.

An electronic device having a speech recognition function may receive a voice command by recognizing the voice of a user, and may perform an operation according to the received voice command. Accordingly, a user may simply use the electronic device without a physical operation (e.g., tactile interaction with a tactile interface of the electronic device). Recently, various electronic devices having speech recognition functions, including mobile terminals, navigation systems, smart cars, and household appliances, have been developed.

SUMMARY

The inventive concepts provide an electronic device capable of determining whether to perform speech recognition and an operating method of the same when another electronic device having a speech recognition function is in the vicinity thereof.

The inventive concepts further provides a method of performing speech recognition by one or more electronic devices intended by a user from among a plurality of electronic devices having a speech recognition function.

According to some example embodiments, an operating method, performed by an electronic device, may include: receiving state information associated with at least one other electronic device, the at least one other electronic device configured to perform speech recognition based on processing audio inputs received at the at least one other electronic device, the state information indicating a priority associated with the at least one other electronic device; comparing a priority associated with the electronic device with the priority associated with the at least one other electronic device, based on receiving the received state information; and deactivating a speech recognition functionality of the electronic device, such that the electronic device is at least partially inhibited from performing speech recognition based on processing audio inputs received at the electronic device, based on a determination that the priority associated with the electronic device is lower than the priority associated with the at least one other electronic device.

According to some example embodiments, an electronic device may include: a communication interface configured to receive state information associated with another electronic device having a speech recognition functionality; a memory storing program instructions; and a processor. The processor may be configured to execute the program instructions to: perform speech recognition based on processing an audio input received at the electronic device, determine a priority associated with the other electronic device based on the received state information, and deactivate the speech recognition functionality of the electronic device, such that the electronic device is at least partially inhibited from performing speech recognition based on processing audio inputs received at the electronic device based on a determination that a priority associated with the electronic device is lower than a priority associated with the other electronic device.

According to some example embodiments, a method may include: determining a first priority value associated with a first electronic device and a second priority value associated with a second electronic device, each of the first electronic device and the second electronic device configured to perform speech recognition based on processing audio inputs received at the first electronic device and the second electronic device, respectively; and selectively deactivating a speech recognition functionality of the first electronic device, such that the first electronic device is at least partially inhibited from performing speech recognition based on processing audio inputs received at the first electronic device, based on a determination that the first priority is lower than the second priority.

According to some example embodiments, a method may include: determining a first priority value associated with a first electronic device and a second priority value associated with a second electronic device, each of the first electronic device and the second electronic device configured to perform speech recognition based on processing audio inputs received at the first electronic device and the second electronic device, respectively; and selectively activating a speech recognition functionality of the first electronic device, such that the first electronic device is at least partially enabled to perform speech recognition based on processing audio inputs received at the first electronic device, based on a determination that the first priority is higher than the second priority.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

An electronic device according to some example embodiments of the inventive concepts may include one or more mobile electronic devices including a smart phone, a tablet personal computer, a personal digital assistant (PDA), or a camera, a wearable device, a smart home appliance, a smart lighting device, a home hub, a smart furniture, a part of a building/structure, various medical devices, an electronic device for a vehicle, a security device, and an industrial or a domestic robot. The electronic device according to some example embodiments of the inventive concepts may be one or a combination of the above various devices. It will be understood that the electronic device according to some example embodiments of the inventive concepts are not limited to the above various devices to those of ordinary skill in the art.

Hereinafter, an electronic device and an operating method of the same according to some example embodiments will be described in detail with reference to the accompanying drawings. A term of "user" used throughout the some example embodiments may indicate a person using an electronic device or another electronic device outputting a voice signal.

Figure 1:
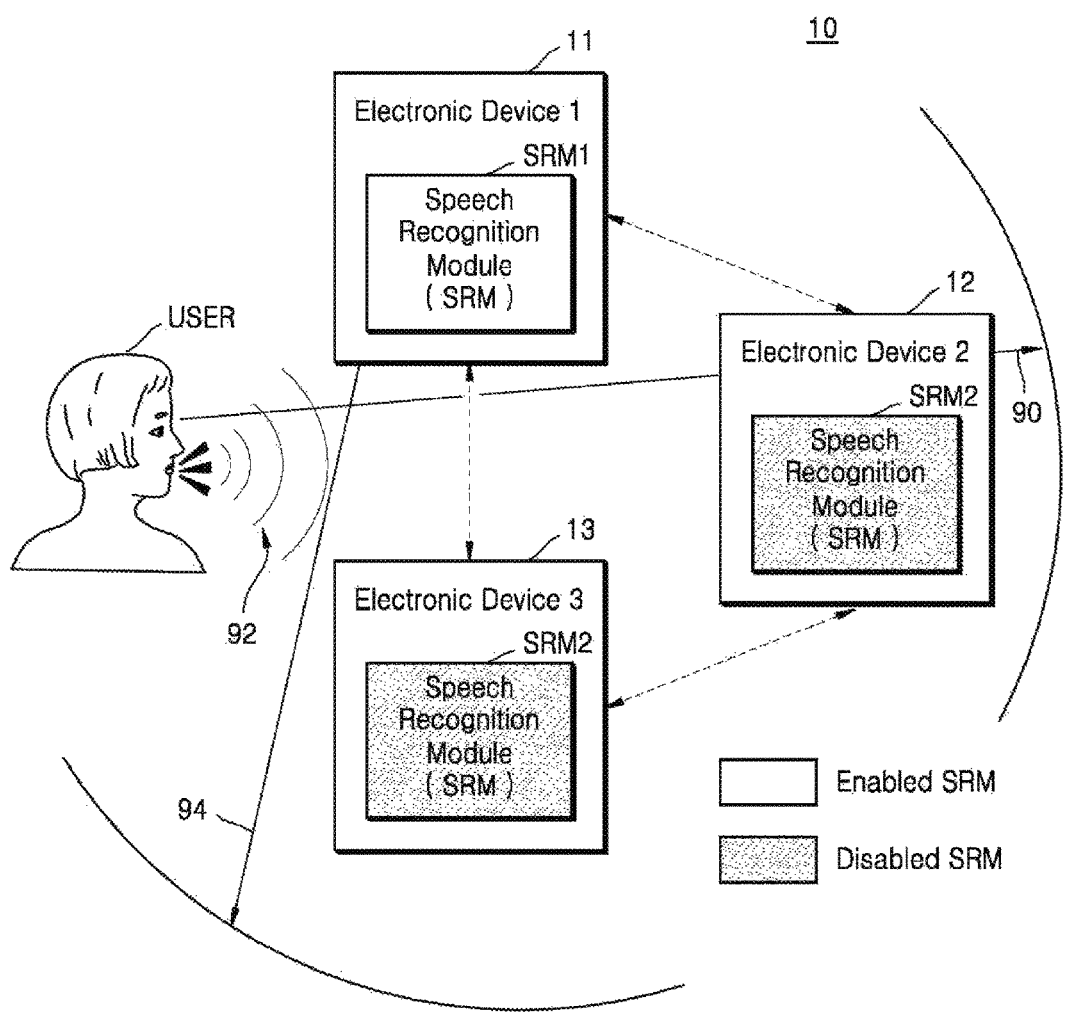
FIG. 1 is a block diagram of a speech recognition system according to some example embodiments of the inventive concepts.

FIG. 1 is a block diagram of a speech recognition system 10 according to some example embodiments of the inventive concepts.

Referring to FIG. 1, the speech recognition system 10 may include a plurality of electronic devices 11, 12, and 13 respectively including speech recognition modules (SRMs) capable of recognizing a voice of a user. As described further below, a speech recognition module (SRM) may be implemented by (e.g., the speech recognition functionality of and/or speech recognition functions performed by a speech recognition module (SRM) may be implemented by) at least one processor that executes program instructions stored in at least one memory (sometimes referred to as a "memory device"). Speech recognition functionality may include a function of analyzing a received voice input and obtaining a voice command from the voice input. Each of the SRMs may be hardware (or hardware components) or software (or software components) performing speech recognition, or an electronic recording medium in which a computer program code performing speech recognition is recorded. However, the SRM is not limited thereto and may be a functional and/or structural coupling of hardware or software for operating hardware. Furthermore, the SRM may also include a device configured to receive audio (e.g., "voice") inputs. Such a device may include an audio interface. The audio interface may include an audio receiver interface (e.g., "microphone"), an audio transmitter interface (e.g., speaker), some combination thereof, or the like.

The electronic devices 11, 12, and 13 may include, for example, first to third electronic devices. However, the number ("quantity") of electronic devices is not limited thereto and may vary. Furthermore, it will be understood that although the terms "first", "second", "third", etc. may be used herein to describe various components, these components should not be limited by these terms.

The electronic devices 11, 12, and 13 may be located within a particular distance 90 of a user within which the electronic devices 11, 12, and 13 may receive, via one or more audio interfaces, an audio output ("voice") 92 of a user as an audio ("voice") input thereto. If and/or when the received voice input is determined, at one or more of the electronic devices 11, 12, and 13, to be associated with (e.g., to be and/or to correspond to) a predefined (e.g., "stored") trigger word, the electronic devices 11, 12, and 13 may activate speech recognition and processing functions, including functions associated with the trigger word, based on the determination. Such activation may include recognizing (e.g., "detecting," "identifying," etc.) the trigger word. The electronic devices 11, 12, and 13 may activate a processing function in response to detecting the trigger word if and/or when the speech recognition function is activated. The electronic devices 11, 12, and 13 may activate the speech recognition and processing functions (e.g., speech recognition functionality) at one or more of the electronic devices 11, 12, and 13 in response to detection of the trigger word if and/or when the speech recognition functionality is deactivated at one or more of the electronic devices 11, 12, and 13. Each of the SRMs may perform speech recognition functions and obtain a voice command from the received voice, and the electronic devices 11, 12, and 13 may perform operations according to the voice command.

In the speech recognition system 10 according to some example embodiments of the inventive concepts, one or more of the electronic devices 11, 12, and 13 may perform speech recognition.

According to some example embodiments, one or more of the electronic devices 11, 12, and 13, which are selected based on state information associated with the electronic devices 11, 12, and 13, may perform speech recognition functions (e.g., perform speech recognition functions corresponding to one or more particular instances of received audio ("voice") input). For example, first to third speech recognition modules SRM1, SRM2, and SRM3 and/or at least some of the functionality associated therewith may be activated or deactivated based on state information associated with the electronic devices 11, 12, and 13, respectively. The state information may include at least one of wired and wireless network connection information (e.g., information indicating a type of communication network connection associated with an electronic device, including whether the electronic device is connected to a wired network connection, wireless network connection, some combination thereof, or the like), user connection information, device type information, operating state information, priority information, and location information of an electronic device (e.g., information indicating a geographic location of an electronic device, information indicating a relative location of an electronic device with reference to another device, some combination thereof, etc.).

According to some example embodiments, one or more of the electronic devices 11, 12, and 13, which have (e.g., be associated with) a higher priority (hereinafter, a priority) than other ones of the electronic devices 11, 12, and 13 with respect to speech recognition, may perform speech recognition corresponding to one or more instances of received audio input. For example, a priority associated with an electronic device may be set based on at least one of a wired and wireless network type, a device type, an operating state, and a location of an electronic device. The priority associated with the electronic device may be predefined or changed according to an operating state or a location change of the electronic device.

For example, when a priority associated with the first electronic device 11 is higher than those of the second and third electronic devices 12 and 13, the first speech recognition module SRM1 included in the first electronic device 11 may be activated, and the second and third speech recognition modules SRM2 and SRM3 respectively included in the second and third electronic devices 12 and 13 may be deactivated. A deactivated speech recognition module (SRM) may be turned off, may be operated in a low power mode, or may not perform a speech recognition algorithm in response to receipt of an audio input at an electronic device that includes the deactivated SRM.

According to some example embodiments, one or more of the electronic devices 11, 12 and 13 associated with a higher priority may receive a voice input and perform speech recognition corresponding to the voice input (e.g., performing speech recognition based on processing the received voice input). For example, a voice receiver and a speech recognition module SRM included in an electronic device having the highest priority may be activated, and a voice receiver and a speech recognition module SRM included in another electronic device may be deactivated.

According to some example embodiments, the electronic devices 11, 12, and 13 may transmit and receive state information to/from each other, and may determine whether to activate or deactivate the respective speech recognition modules SRM1, SRM2, and SRM3 by determining a priority based on the state information, respectively.

According to some example embodiments, if and/or when an electronic device having speech recognition functionality is sensed within a certain distance 94 of another electronic device, the electronic devices 11, 12, and 13 located within the distance 94 of each other may transmit and receive state information to/from each other. When a user provides a voice output 92 after the speech recognition modules SRM1, SRM2, and SRM3 of the electronic devices 11, 12, and 13 are activated or deactivated based on the state information, the activated speech recognition module(s) SRM may perform speech recognition based on processing the voice output 92 that is received as voice input to the activated speech recognition module(s). When a user provides a voice input, an electronic device including an activated speech recognition module SRM may detect ("obtain," "identify," etc.) a trigger word based on the voice input of the user, and may perform voice input and processing functions accordingly.

According to some example embodiments, the electronic devices 11, 12, and 13 may periodically transmit and receive state information to/from each other. According to some example embodiments, when a user provides a voice input and the speech recognition modules SRM1, SRM2, and SRM3 of the electronic devices 11, 12, and 13 obtain a trigger word from the voice input of the user, the electronic devices 11, 12, and 13 may transmit and receive state information to/from each other. Accordingly, the speech recognition modules SRM1, SRM2, and SRM3 of the electronic devices 11, 12, and 13 may be activated or deactivated based on the state information, respectively. The activated speech recognition module SRM may obtain a voice command from a next voice input of the user, and an electronic device including the activated speech recognition module SRM may perform an operation according to the voice command.

According to some example embodiments, if and/or when another electronic device having a speech recognition function is located within a desired (or, alternatively, prescribed) distance 94, the electronic devices 11, 12, and 13 may activate a speech recognition function in response to a detected trigger word and a predefined word. For example, the predefined word may be a product name or a desired (or alternatively, predefined) nickname associated with the electronic devices 11, 12, and 13, or a word specifying some or all of the electronic devices 11, 12, and 13.

According to some example embodiments, a speech recognition function associated with a particular (or, alternatively, predefined) master device from among the electronic devices 11, 12, and 13 may be activated, and speech recognition functions of slave devices from among the electronic devices 11, 12, and 13 may be deactivated. The master device may provide the slave devices with a voice command obtained from a received voice input, and the slave devices may perform an operation according to the voice command. According to some example embodiments, the master device may sense an action of a user corresponding to the slave device when receiving a voice input of the user, and may determine the slave device corresponding to the user action. The master device may provide the slave device corresponding to the user action with a control command for activating a speech recognition function. The slave device corresponding to the user action may receive the voice input of the user and may perform speech recognition and processing.

According to some example embodiments, the electronic devices 11, 12, and 13 may be associated with a common trigger word. For example, if and/or when "OK" is a trigger word commonly applied to the electronic devices 11, 12, and 13 and a user says (e.g., generates a voice output 92) that includes the audio command "OK, turn it off", the electronic devices 11, 12, and 13 may perform speech recognition and processing according to the trigger word "OK" detected from the voice input. Each speech recognition modules SRM1, SRM2 and SRM3 of the electronic devices 11, 12, and 13 may perform speech recognition corresponding to a voice input "turn it off", and accordingly, the electronic devices 11, 12, and 13 may turned off based on the obtained voice command.

When a user intends to turn off (e.g., inhibit the supply of at least a certain amount of electrical power to inhibit at least some functionality of) only one electronic device, other electronic devices may also perform speech recognition and may be turned off according to the voice command, unnecessarily. Therefore, power of the electronic device may be unnecessarily wasted and a malfunction of the same may occur.

In the speech recognition system 10 according to some example embodiments of the inventive concepts, even if the electronic devices 11, 12, and 13 are associated with a common trigger word, one or more of the electronic devices 11, 12, and 13 may perform speech recognition and the other electronic devices of the electronic devices 11, 12, and 13 may be inhibited from performing speech recognition corresponding to received voice inputs, thus, waste of power and a malfunction of the electronic devices 11, 12, and 13 may be prevented, as described above.

Hereinafter, an electronic device and an operating method of the same applied to the speech recognition system 10 according to some example embodiments of the inventive concepts will be described in detail.

Figure 2:
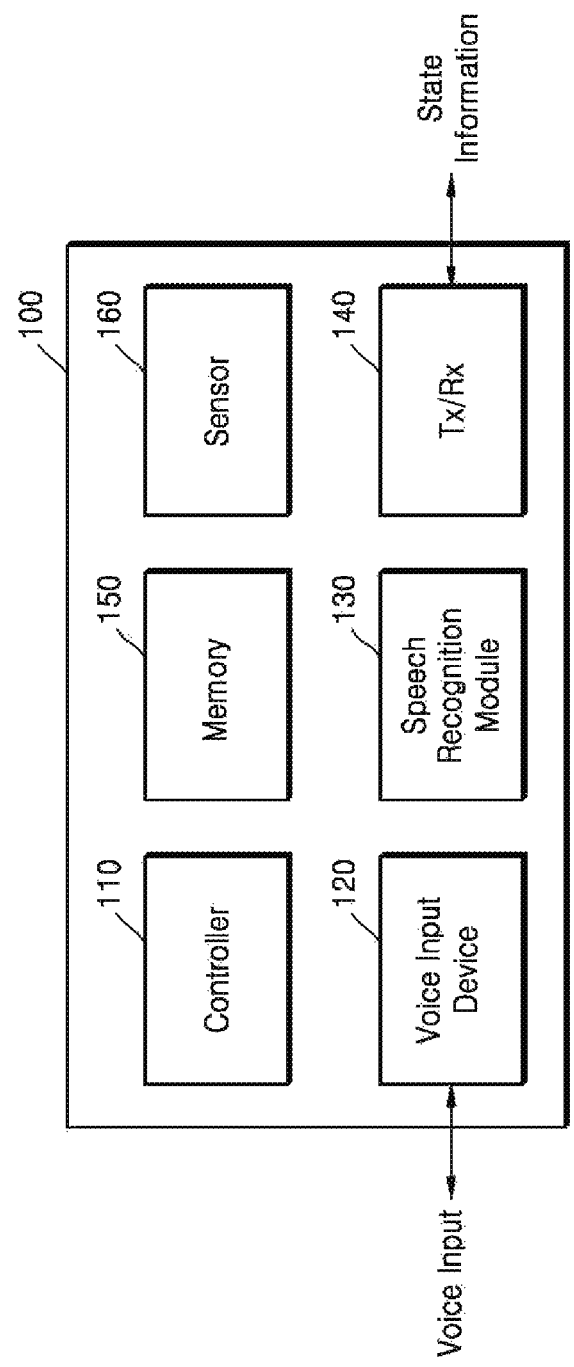
FIG. 2 is a schematic block diagram of an electronic device according to some example embodiments of the inventive concepts.

FIG. 2 is a schematic block diagram of an electronic device 100 according to some example embodiments of the inventive concepts. The electronic device 100 of FIG. 2 is an electronic device having speech recognition functionality, and may be applied to at least one of the electronic devices of the speech recognition system 10 of FIG. 1.

Referring to FIG. 2, the electronic device 100 may include a controller 110, a voice input device 120, a speech recognition module (hereinafter, SRM) 130, a communication interface 140, and a memory 150. The electronic device 100 may further include a sensor 160.

The controller 110 may control a general operation of the electronic device 100, and may further control operations of other components of the electronic device 100. The controller 110 may include one or more processors. A processor may include one or more of a central processing unit (CPU), a graphic processing unit (GPU), a digital signal processor (DSP), and custom hardware, and may be realized as various kinds of software, hardware, or firmware. The processor may implement the functionality of at least the controller 110 based on executing program instructions stored at the memory 150.

The controller 110 may control the SRM 130 to be activated or deactivated. The controller 110 may respectively determine priorities of the electronic device 100 and another electronic device based on state information of the electronic device 100 and another electronic device, and may control the SRM 130 of the electronic device 100 based on the priorities of the electronic device 100 and another electronic device. In some example embodiments, the controller 110 may control the SRM 130 to be deactivated when the priority associated with electronic device 100 is lower than the priority associated with another electronic device. In some example embodiments, the controller 110 may control the SRM 130 to be activated when the priority associated with electronic device 100 is higher than the priority associated with another electronic device. Furthermore, in some example embodiments, the controller 110 may control the electronic device 100 to perform an operation according to a voice command. In some example embodiments, determining that the voice command corresponds to another electronic device, the controller 110 may transmit the recognized voice command or a control signal for activating a speech recognition function of another electronic device to another electronic device which is intended by a user. In some example embodiments, for example if and/or when the controller 110 includes a processor, the controller 110 may implement at least the speech recognition module 130 based on executing program instructions stored at the memory 150.

The voice input device 120, which may include an audio ("voice") interface device (e.g., a microphone) may receive a voice input of a user. The voice input device 120 may obtain ("generate") electrical voice data based on processing a voice input (e.g., voice signal) received as an audio input from an external environment that is external to the electronic device 100. The voice input device 120 may include a signal processing module configured to remove noise from the received voice signal and process the signal. The voice input device 120 may be, for example, a microphone.

The SRM 130, which may be at least partially implemented by the controller 110 in some example embodiments, may perform speech recognition functionality based on a received voice input. The SRM 130 may perform a speech recognition algorithm. As described above with reference to FIG. 1, the SRM 130 may be realized ("implemented") by hardware (or hardware components), software (or software components), firmware, or a coupling of software and hardware, or an electronic recording medium in which an algorithm, that is, a computer program code performing speech recognition is recorded. For example, the SRM 130 may include a dedicated speech recognizer, and may further include a dedicated processor that may include one or more of a CPU, GPU, DSP, and custom hardware. In addition, the SRM 130 may include an operation circuit configured to process a speech recognition algorithm. The SRM 130 may further include a variety of components operated until a time when the SRM 130 receives a voice input and performs a speech recognition algorithm, for example, a microphone, a codec, an analog-digital converter, or a communication interface.

In some example embodiments, the voice input device 120 and the SRM 130 are shown as separate components but are not limited thereto, and the voice input device 120 may be realized as a part of the SRM 130. Furthermore, the SRM 130 and the controller 110 may be integrated with each other.

The communication interface 140 may receive state information associated with another electronic device from at least one other electronic device that is external to the electronic device 100 and is further configured to perform a speech recognition function. The communication interface 140 may provide the controller 110 with the received state information. The communication interface 140 may transmit state information associated with the electronic device 100 to another, separate electronic device. The communication interface 140 may determine whether at least one other electronic device that is separate from the electronic device 100 and is configured to perform a speech recognition function is located within a particular (or, alternatively, prescribed) distance 94 of the electronic device 100. The communication interface 140 may transmit and receive data (for example, state information) to/from another electronic device within a prescribed distance 94 based on using at least one of various communication protocols including at least one of Wi-Fi, long term evolution (LTE), bluetooth, radio frequency identification (RFID), infrared data association (IrDA), ultra wideband (UWB), ZigBee, Wi-Fi direct (WFD), and near field communication (NFC). According to some example embodiments, the communication interface 140 may transmit and receive data to/from another electronic device through various types of wired and wireless networks or serial communications including at least one of Internet, a local area network (LAN), a wireless LAN, a wide area network (WAN), and a personal area network (PAN).

The memory 150 may store a control command code, control data, or user data controlling the electronic device 100. According to some example embodiments, the memory 150 may store a speech recognition algorithm. Furthermore, the memory 150 may be used as an operation memory of the controller 110. The memory 150 may include at least one of volatile memory and nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), or ferroelectric RAM (FRAM). The volatile memory may include at least one of dynamic RAM (DRAM), static RAM (SRAM), synchronous RAM (SDRAM), phase-change RAM (PRAM), MRAM, RRAM, and FRAM.

The sensor 160 may generate state information by sensing various signals or information (a chemical signal, an electrical signal, etc.) generated inside or outside the electronic device 100. For example, the sensor 160 may sense environmental information inside/outside the building or vehicle including the electronic device 100. When the electronic device 100 is a wearable device, the sensor 160 may sense a peripheral environment or biological information of a user. Furthermore, the sensor 160 may sense information related to a location, an operating state, or states of components of the electronic device 100. The sensor 160 may sense a location of the electronic device 100, for example, whether the electronic device 100 is located indoor or outdoor, or in a specific area such as a car or a house. In some example embodiments, the sensor 160 may sense whether another electronic device exists within a prescribed distance.

In addition, the electronic device 100 may further include an input/output device such as a display or a camera, a storage device, or a power management device.

Figure 3:
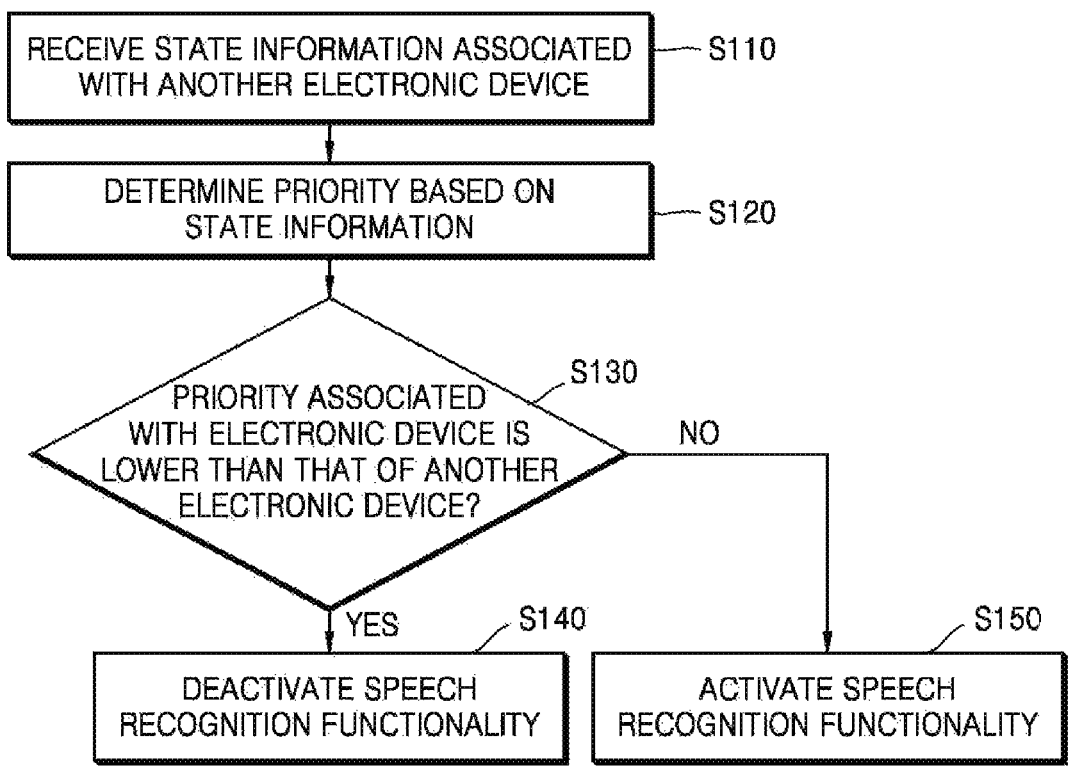
FIG. 3 is a flowchart illustrating an operating method of an electronic device having a speech recognition function, according to some example embodiments of the inventive concepts.

FIG. 3 is a flowchart illustrating an operating method that may be performed by an electronic device configured to have speech recognition functionality, according to some example embodiments of the inventive concepts. In more detail, FIG. 3 illustrates a method of determining whether to perform a speech recognition function, and may be performed by the electronic device 100 of FIG. 2. The descriptions with reference to FIG. 2 may be applied to the method of FIG. 3.

Referring to FIG. 3, an electronic device (for example, the electronic device 100 of FIG. 2) may receive state information associated with another electronic device (S110). The state information may include wired and wireless network connection information, user connection information, device type information, operating state information, priority information, location information associated with an electronic device, some combination thereof, or the like.

Wired and wireless network connection information associated with an electronic device may include information indicating whether a network connected to the electronic device is a wired network or a wireless network, or may include types of networks. User connection information associated with an electronic device may include, for example, information indicating a distance between the electronic device and a user, whether the electronic device is a wearable device or not, some combination thereof, or the like. The device type information associated with an electronic device may indicate information associated with a device used in a specific place or predefined to perform a specific function such as a smart home hub, a navigation system, a dedicated speech recognizer, or a master device. The operating state information associated with an electronic device may indicate whether the electronic device is presently performing an action ("function") according to an operation of a user or in a standby state (or an idle state), may indicate a resource usage state of the electronic device such as a power state, a temperature, or a memory, some combination thereof, or the like. The priority information associated with an electronic device may include a priority level set in advance with respect to the electronic device, or variably set according to a location or a state of the electronic device. State information associated with an electronic device may include various kinds ("types") of information related to the electronic device.

The electronic device 100 may determine a priority associated with one or more electronic devices based on the received state information (S120). The electronic device 100 may determine a priority associated with another electronic device based on the received state information associated with the other electronic device, and may further determine a priority associated with the electronic device 100 based on state information associated with the electronic device 100.

The priority associated with the electronic device 100 may be compared with a priority associated with another electronic device (S130). If and/or when the priority associated with the electronic device 100 is lower than that of another electronic device, the electronic device 100 may deactivate a speech recognition function, speech recognition functionality, etc. of the electronic device 100 (S140). For example, the controller 110 (of FIG. 2) may deactivate the SRM 130 (of FIG. 2). Deactivating an SRM 130 may include a processor implementing one or more of the controller 110 and the SRM 130 inhibiting speech recognition functionality associated with the implementation of the SRM 130 in the electronic device 100. The SRM 130 (of FIG. 2) may be turned off or may be operated in a low power mode, if and/or when the SRM is deactivated. In some example embodiments, the SRM 130 may be inhibited from performing a speech recognition algorithm based on received voice input. In some example embodiments, the controller 110 may also deactivate the voice input device 120 at (S140).

If and/or when the priority associated with the electronic device 100 is higher than or the same as (e.g., equal to or greater than) that of another electronic device, the electronic device 100 may activate a speech recognition function, speech recognition functionality, etc. of the electronic device 100 (S150). For example, the controller 110 may activate the SRM 130 and the voice input device 120. According to some example embodiments, when the priority associated with the electronic device 100 is the highest of a plurality of electronic devices detected by the electronic device 100, the electronic device 100 may activate a speech recognition function at the electronic device 100.

Since a speech recognition function of an electronic device is activated or deactivated according to the operating method of the electronic device of FIG. 3, even if a plurality of electronic devices having a speech recognition function are located within a particular (or, alternatively, prescribed) distance 94, one or more of the electronic devices selected according to a relationship between the electronic devices may perform speech recognition (e.g., speech recognition functionality) and the other electronic devices may be inhibited from performing speech recognition (e.g., speech recognition functionality) corresponding to a voice input received thereby, such that the performance of speech recognition functionality by all of the electronic devices based on a voice input of a user is limited and/or prevented such that the performance of speech recognition functionality is limited to an individual electronic device.

The operating method of the electronic device of FIG. 3 may be performed before the electronic device 100 receives a voice input, or after the electronic device 100 receives the voice input from a user and is triggered (e.g., detects a trigger word based on processing the voice input). It will be described in detail with reference to FIGS. 4 and 5.

Figure 4:
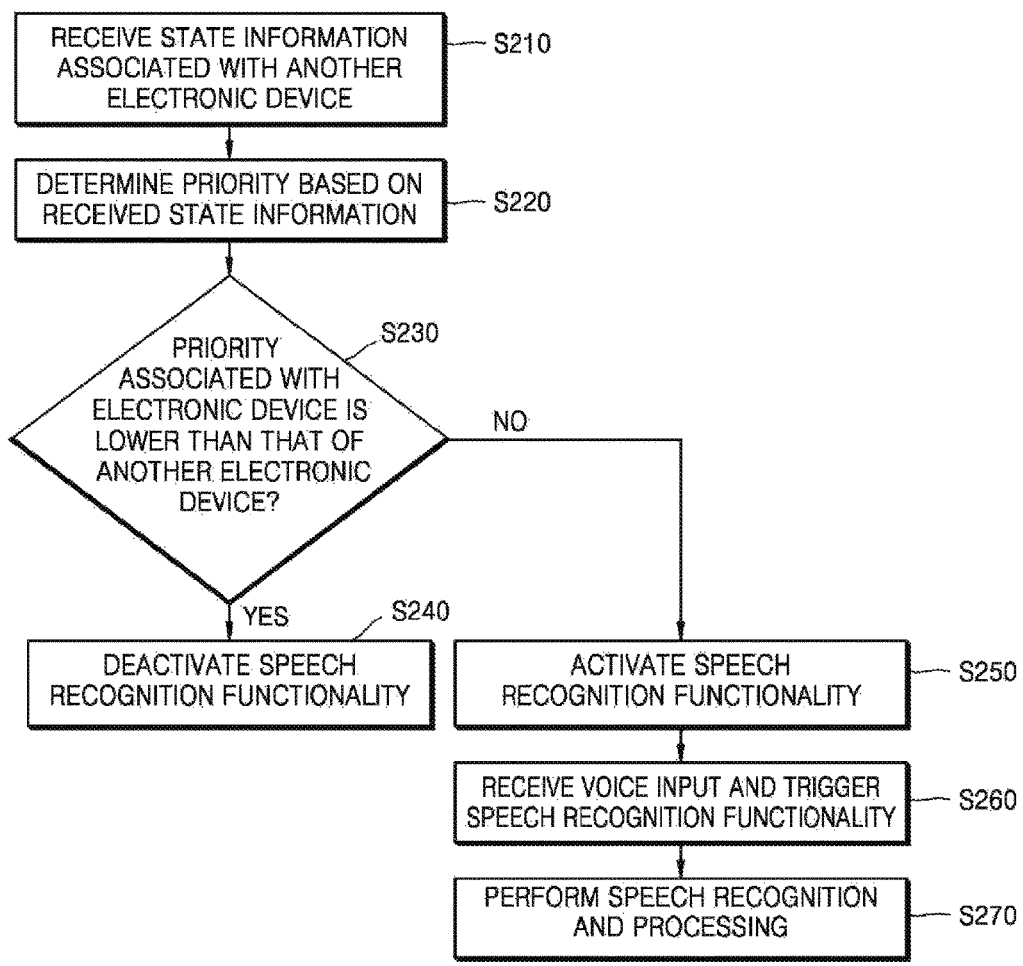
FIG. 4 is a flowchart illustrating an operating method of an electronic device according to some example embodiments of the inventive concepts.

FIG. 4 is a flowchart illustrating an operating method of an electronic device according to some example embodiments of the inventive concepts. The operating method of the electronic device of FIG. 4 describes that the operating method of the electronic device of FIG. 3 is performed before the electronic device 100 receiving a voice input.

Referring to FIG. 4, the electronic device 100 may receive state information associated with another electronic device (S210), and may respectively determine priorities associated with another electronic device and the electronic device 100 based on the received state information and internal state information (S220). The electronic device 100 may determine whether its local priority associated with the electronic device 100 is lower than the priority associated with another electronic device (S230), may deactivate a speech recognition function if the priority associated with the electronic device 100 is lower than that of another electronic device (S240), and may activate the speech recognition function if the priority associated with the electronic device 100 is higher than or the same as (e.g., equal to or greater than) that of another electronic device (e.g., the priority associated with another electronic device) (S250). Since operations S210 through S250 are substantially the same (e.g., the same within manufacturing tolerances and/or material tolerances) as those of S110 through S150 of FIG. 3, repeated descriptions thereof will not be given.

After the speech recognition function is activated, the electronic device 100 may receive a voice input of a user and the speech recognition function may be triggered based on detection of a trigger word obtained based on processing the voice input (S260). The electronic device 100 may receive the voice input of the user and may perform an operation according to a voice command obtained ("identified") by performing speech recognition functionality with regard to the received voice input (S270). If and/or when the speech recognition function is deactivated (S240), even if a user provides a voice input, the electronic device 100 may not receive the voice input (e.g., the electronic device 100 may be inhibited from receiving and/or processing the voice input, based on the deactivation of speech recognition functionality at the electronic device 100 at S240).

In some example embodiments, one or more of the operating methods illustrated and described herein, including the method illustrated in FIG. 4, may be implemented by a device that is separate from the electronic device 100. For example, a third electronic device may determine priorities associated with electronic device 100 and at least one other electronic device that is separate from the third electronic device, respectively. In some example embodiments, the third electronic device may selectively activate or deactivate speech recognition functionality of electronic device 100, based on a determination (S230) regarding whether the electronic device 100 has a priority that is higher or lower than that of the at least one other electronic device, respectively. The third electronic device may selectively activate or deactivate speech recognition functionality of a separate electronic device based on transmitting a command to the separate electronic device, where the command, upon being executed by the separate electronic device, causes the separate electronic device to activate or deactivate speech recognition functionality thereof, respectively.

Figure 5:
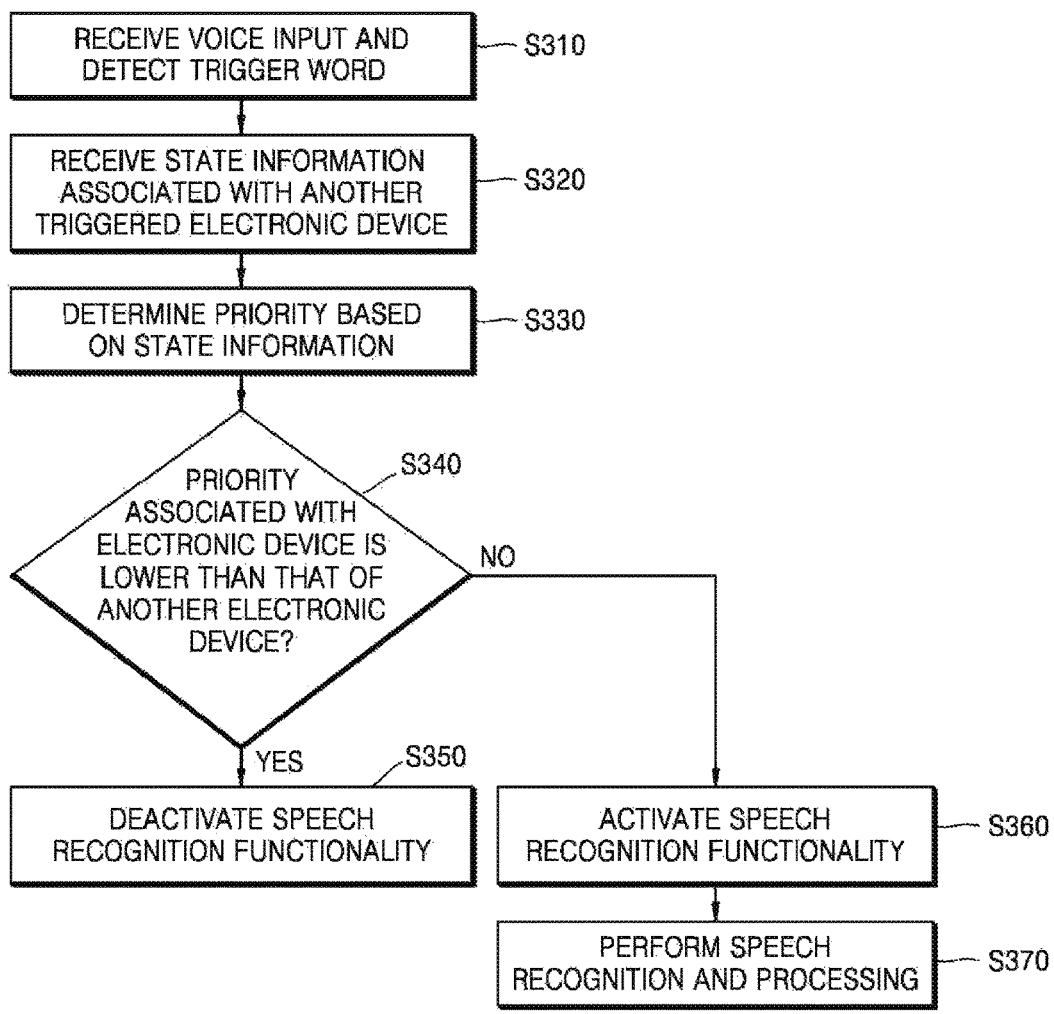
FIG. 5 is a flowchart illustrating an operating method of an electronic device according to some example embodiments of the inventive concepts.

FIG. 5 is a flowchart illustrating an operating method of an electronic device according to some example embodiments of the inventive concepts. The operating method of the electronic device of FIG. 5 describes that the operating method of the electronic device of FIG. 3 is performed after the electronic device 100 receives a voice input from a user and is "triggered" (e.g., detects a trigger word based on processing the voice input).

Referring to FIG. 5, the electronic device 100 may receive the voice input and may be triggered (e.g., in a triggered state) associated with a particular trigger word based on detection of the trigger word from the voice input, according to processing the voice input (S310). In this case, the triggered state may be a state of recognizing that a voice input to be received in the future may include a voice command of a user corresponding to an electronic device.

The electronic device 100 may receive state information associated with another triggered electronic device that is separate from the electronic device 100 (S320). The electronic device 100 may receive state information associated with a triggered electronic device from among one or more electronic devices having voice input functionality (e.g., configured to at least process voice inputs). The electronic device 100 may transmit state information associated with the electronic device 100 to another triggered electronic device.

Next, the electronic device 100 may determine a priority associated with the electronic device 100 based on the state information (S330), may compare the priority associated with the electronic device 100 with that of another electronic device (S340), may deactivate a speech recognition functionality of the electronic device 100 if and/or when the priority associated with the electronic device 100 is lower than that of another electronic device (S350), and may activate the speech recognition functionality of the electronic device 100 if the priority associated with the electronic device 100 is higher than or the same as (e.g., equal to or greater than) that of another electronic device (S360). Since operations S330 through S360 are substantially the same (e.g., the same within manufacturing tolerances and/or material tolerances) as those of S120 through S150 of FIG. 3, repeated descriptions thereof will not be given.

If and/or when the speech recognition functionality of the electronic device 100 is activated, the electronic device 100 may recognize (e.g., "detect") and process a received voice input of a user (S370). Since the electronic device 100 is already triggered, based on detection ("identification") of a trigger word based on processing a voice input, the electronic device 100 may perform speech recognition and process a voice command without obtaining an additional trigger word.

Figure 6:
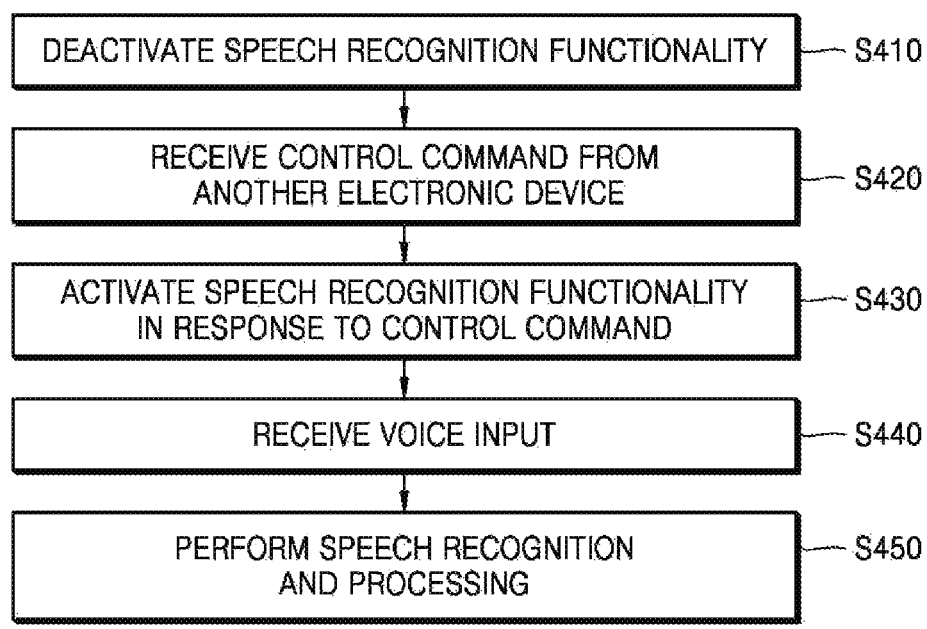
FIG. 6 is a flowchart illustrating an operating method of an electronic device according to some example embodiments of the inventive concepts.

FIG. 6 is a flowchart illustrating an operating method of an electronic device according to some example embodiments of the inventive concepts. The operating method of the electronic device of FIG. 6 describes that the operating method of the electronic device of FIG. 3 is performed after deactivating a speech recognition functionality of the electronic device.

Referring to FIG. 6, after deactivating the speech recognition functionality (S410), the electronic device 100 may receive a control command from another electronic device (S420). The other electronic device may be an electronic device configured to perform speech recognition or a master device corresponding to the electronic device 100. The control command may be a speech recognition enable-signal.

The electronic device 100 may activate speech recognition functionality in response to receiving and processing the control command (S430). The electronic device 100 may receive a voice input of a user (S440), and may perform speech recognition and processing of the voice input, based on activating the speech recognition functionality (S450). According to some example embodiments, after being triggered by detecting a trigger word based on processing the received voice input, the electronic device 100 may perform the speech recognition and processing.

As described above with reference to FIG. 6, even if a speech recognition functionality of the electronic device 100 is deactivated, the speech recognition functionality may be activated again later based on a control command received from another electronic device. Furthermore, according to some example embodiments, when periodically receiving state information associated with another electronic device, recognizing another new electronic device located within a prescribed distance, or recognizing separation of another electronic device located within a prescribed distance, the electronic device 100 may receive state information from another electronic device and may determine whether to activate or deactivate a speech recognition function based on the received state information.

Figure 7:
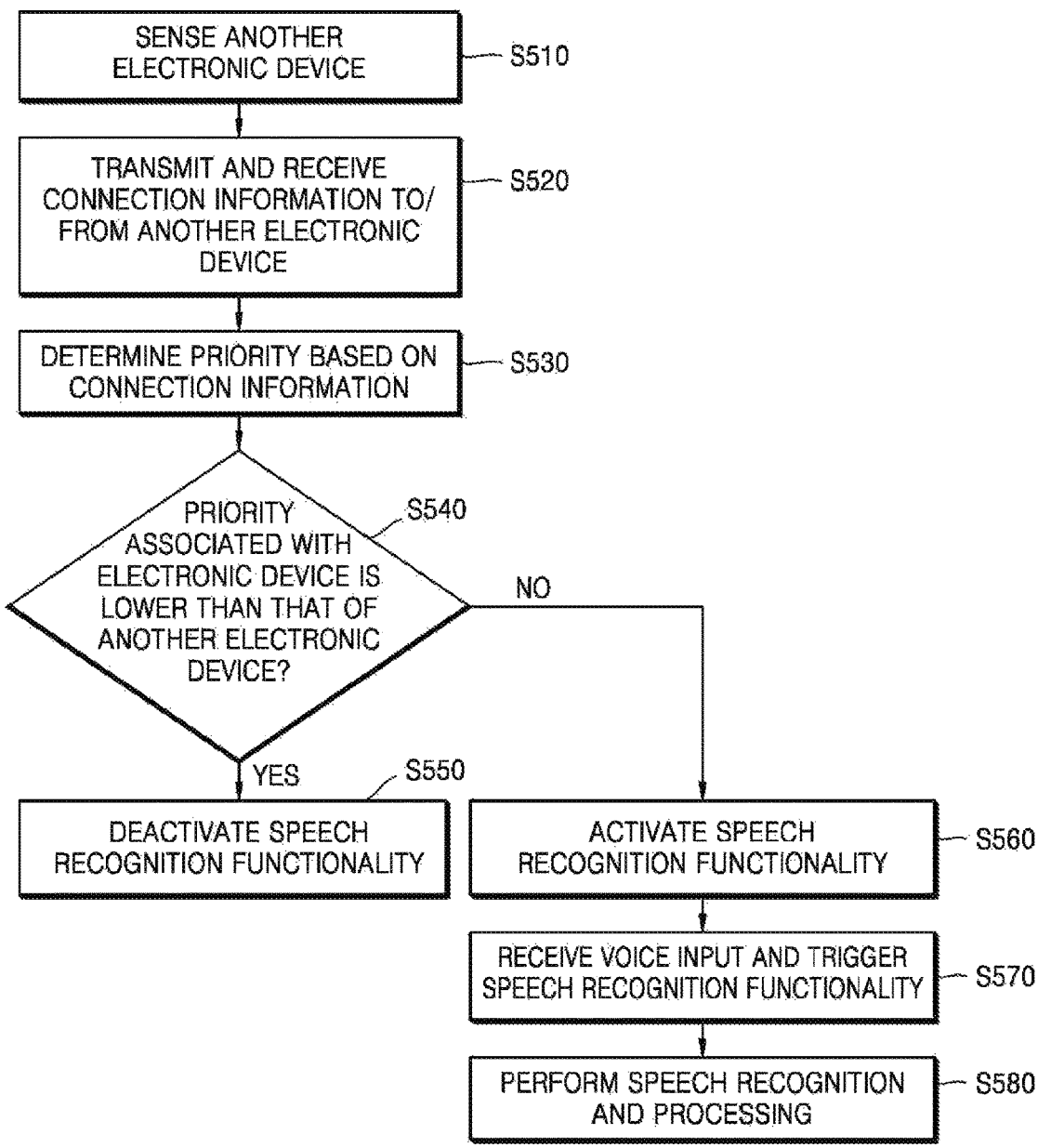
FIG. 7 is a flowchart illustrating an operating method of an electronic device according to some example embodiments of the inventive concepts.

FIG. 7 is a flowchart illustrating an operating method of an electronic device according to some example embodiments of the inventive concepts. FIG. 7 illustrates a method of recognizing a connection state and determining whether to activate or deactivate a speech recognition function by the electronic device.

Referring to FIG. 7, the electronic device 100 may sense another electronic device (S510). The electronic device 100 may sense another electronic device based on being paired with another electronic device having speech recognition functionality, detecting the other electronic device via an exchange of communication signals between the electronic devices, some combination thereof, or the like.

The electronic device 100 may transmit and receive connection information associated with one or more electronic devices to/from another electronic device (S520). The connection information may include at least one of wired and wireless network connection information, and connection information between a user and a device (a distance between the electronic device 100 and a user, or whether the electronic device 100 is a wearable device or not). The electronic device 100 may transmit the connection information associated with the electronic device 100 to another electronic device, and may receive the connection information associated with another electronic device. The transmitting and receiving of the connection information may be performed during a process of pairing the electronic device 100 with another electronic device.

The electronic device 100 may determine a connection state of the electronic device 100 and another electronic device based on the connection information, and may determine whether to activate or deactivate a speech recognition function based on the connection information.

The electronic device 100 may determine a priority based on the connection information (S530), and may compare the priority with that of another electronic device (S540). The priority based on the connection information may be predefined. The priority based on the connection information may be changed according to a location of the electronic device 100. For example, a priority associated with an electronic device closer to a user, for example, a wearable device, may be higher than those of other devices. Furthermore, a priority associated with an electronic device connected to a wired network may be higher than that of an electronic device connected to a wireless network. However, the priority associated with the electronic device connected to the wired network may be lower than that of the electronic device connected to the wireless network in outdoor areas. However, this is only an example, and priorities may be variously set by considering operation characteristics of electronic devices and electronic device usage patterns of a user.

The electronic device 100 may deactivate a speech recognition function if the priority associated with the electronic device 100 is lower than that of another electronic device (S550), and may activate the speech recognition function if the priority associated with the electronic device 100 is higher than or the same as that of another electronic device (S560). For example, when the electronic device 100 is a wearable device and another electronic device is non-wearable device, the electronic device 100 may activate the speech recognition functionality of the electronic device by determining that the priority associated with the electronic device 100 is higher ("greater") than that of another electronic device detected by the electronic device 100.

After the speech recognition functionality of the electronic device 100 is activated, the electronic device 100 may receive a voice input of a user and the speech recognition functionality may be triggered based on detection of a trigger word obtained from the voice input (S570). The electronic device 100 may continuously receive a voice input of a user, and may perform speech recognition and processing with regard to the received voice input (S580).

Figure 8A:
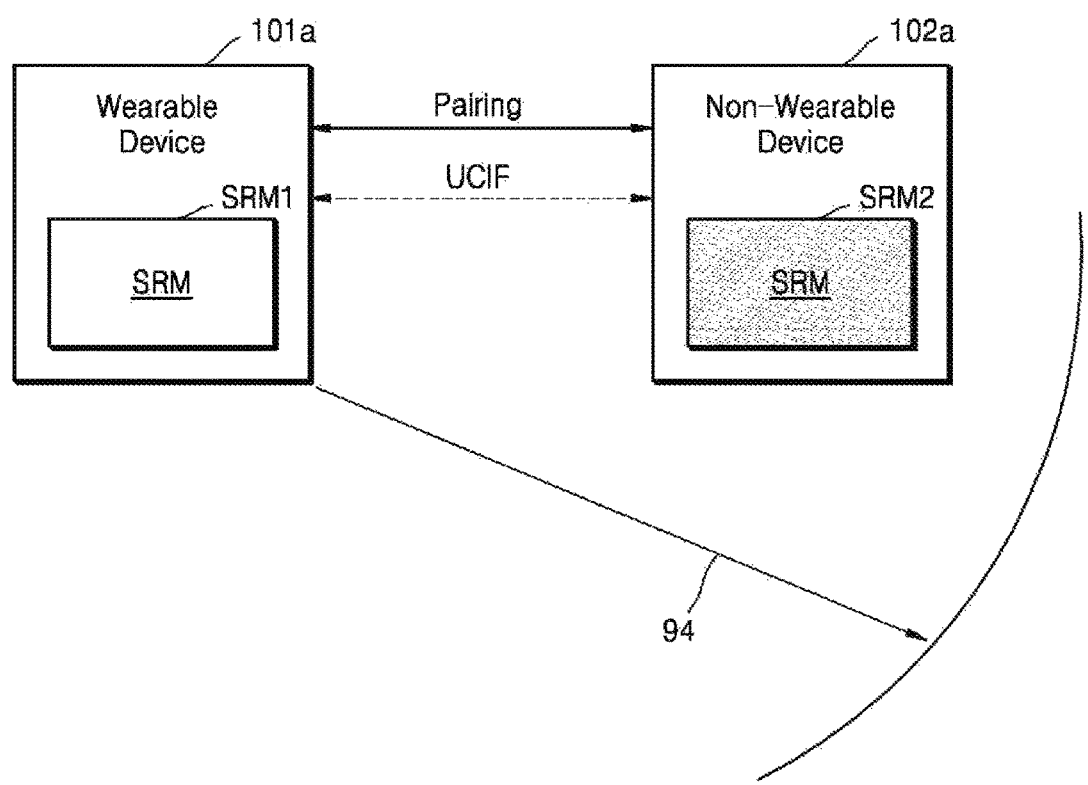
FIG. 8A and FIG. 8B are example views for explaining an operation of an electronic device according to the operating method of FIG. 7.
Figure 8B:
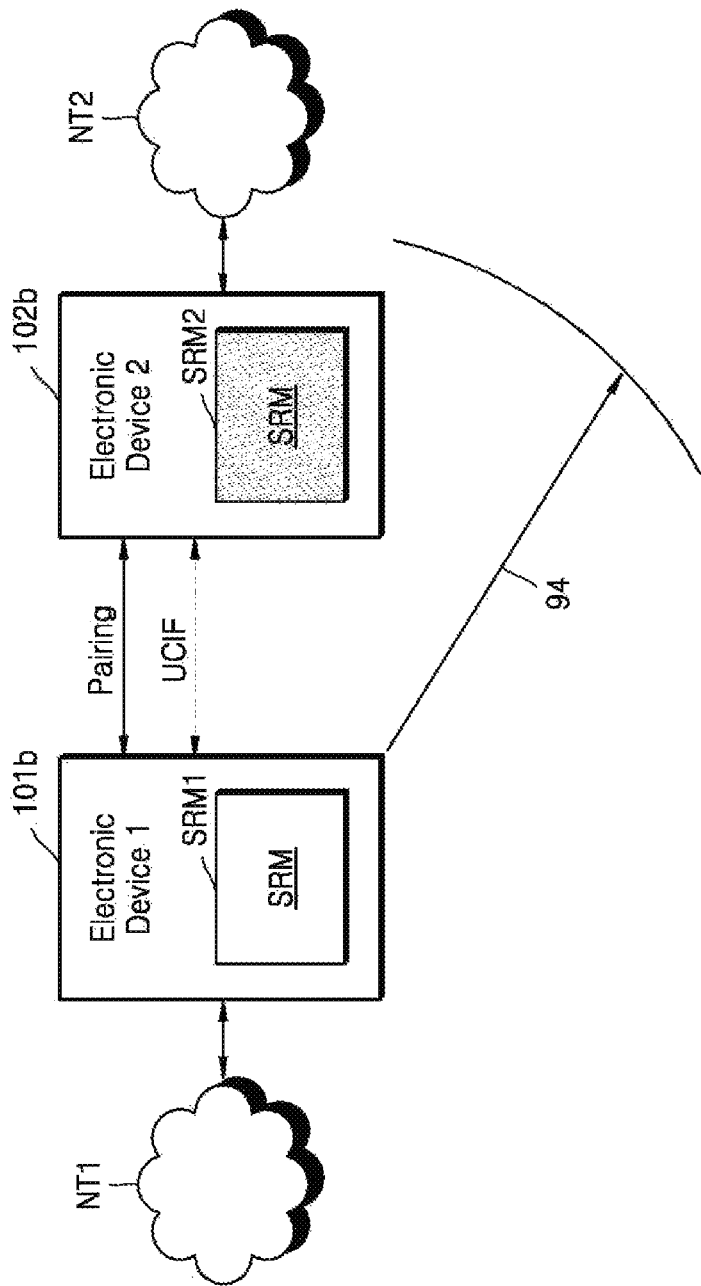

FIGS. 8A and 8B are example views for explaining an operation of an electronic device according to the operating method of FIG. 7. FIG. 8A illustrates an electronic device operating based on a connection state of the electronic device and a user, and FIG. 8B illustrates an electronic device operating based on a connection state of the electronic device and a network.

Referring to FIG. 8A, a first electronic device 101a may be a wearable device such as a smart watch or smart glasses, and a second electronic device 102a may be a non-wearable device such as a smart phone or a tablet personal computer (PC).

When the first and second electronic devices 101a and 102a are located within a prescribed distance 94 of each other, the first and second electronic devices 101a and 102a may sense each other and be paired. The sensing may include a first electronic device detecting signals transmitted by another electronic device that is within the distance 94 of the first electronic device. The first and second electronic devices 101a and 102a may transmit and receive user connection information (UCIF) to/from each other. The UCIF may include information about, for example, a distance from a user, or whether the first and second electronic devices 101a and 102a are wearable devices or not.

A priority associated with the first electronic device 101a may be compared to that of the second electronic device 102a based on two pieces ("instances") of respectively received UCIF. The first speech recognition module SRM1, which may be at least partially implemented by a processor of the first electronic device 101a, may be activated based on a determination at the first electronic device 101a that a priority associated with the first electronic device 101a is higher than that of the second electronic device 102a. The second speech recognition module SRM2, which may be at least partially implemented by a processor of the second electronic device 102a may be deactivated by determining that the priority associated with the first electronic device 101a is higher than that of the second electronic device 102a.

Referring to FIG. 8B, first and second electronic devices 101b and 102b may be connected (e.g., communicatively coupled) to different communication networks NT1 and NT2, respectively. If and/or when the first and second electronic devices 101b and 102b are located within a prescribed distance 94 of each other, the first and second electronic devices 101b and 102b may sense each other and be paired (e.g., communicatively linked).

The first and second electronic devices 101b and 102 may transmit and receive network connection information (NCIF) to/from each other. NCIF transmitted by an electronic device may include information indicating a priority associated with the electronic device. The NCIF may include, for example, information indicating whether one or more of the first and second electronic devices 101b and 102b are connected to a wired network or a wireless network, or network type information.

A priority associated with the first electronic device 101b may be compared to that of the second electronic device 102b based on two pieces of respectively received NCIF. It will be assumed that a priority associated with an electronic device connected to a wired network may be higher than that of an electronic device connected to a wireless network. If and/or when a first network NT1 connected to the first electronic device 101b is a wireless network and a second network NT2 connected to the second electronic device 102b is a wired network, the first speech recognition module SRM1 may be activated based on a determination that a priority associated with the first electronic device 101b is higher than that of the second electronic device 102b. The second speech recognition module SRM2 may be deactivated based on a determination that the priority associated with the first electronic device 101b is higher than that of the second electronic device 102b.

Meanwhile, although FIGS. 8A and 8B illustrate two electronic devices on an assumption that they are paired, the inventive concepts are not limited thereto. Furthermore, when three or more electronic devices are paired with one another, activation or deactivation of a speech recognition function of each electronic device may be determined according to the operating method described above.

Figure 9:
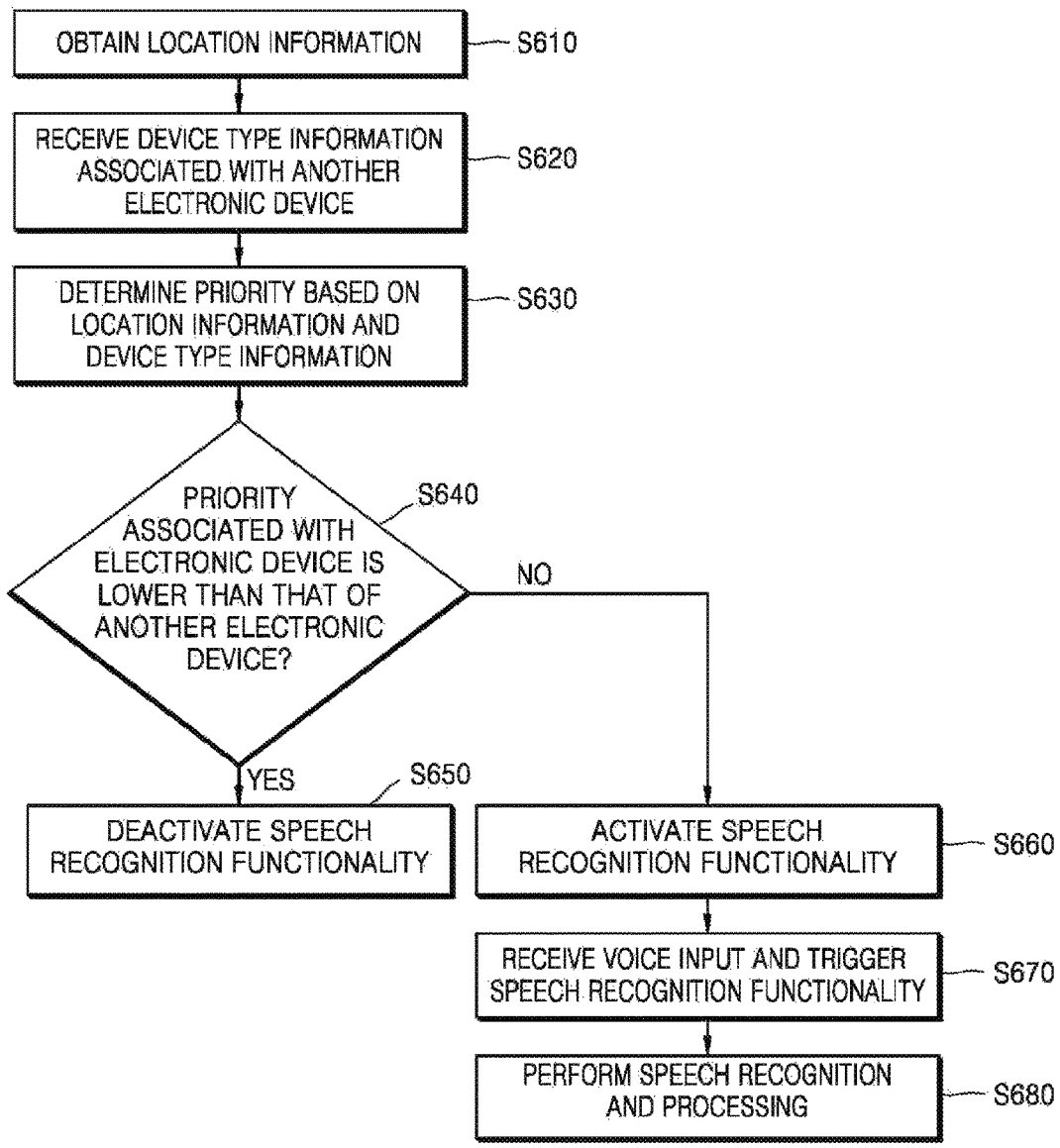
FIG. 9 is a block diagram of an operating method of an electronic device according to some example embodiments of the inventive concepts.

FIG. 9 is a block diagram of an operating method of the electronic device 100 according to some example embodiments of the inventive concepts. FIG. 9 illustrates a method of recognizing a location of the electronic device 100 and determining whether to activate or deactivate a speech recognition functionality of the electronic device 100.

Referring to FIG. 9, the electronic device 100 may obtain (receive) location information associated therewith (S610). The electronic device 100 may obtain information indicating whether it is located indoors or outdoors or at a specific location. For example, the electronic device 100 may obtain location information based on a sensing signal generated by the sensor 160 of the electronic device (FIG. 2). In some example embodiments, the electronic device 100 may obtain location information based on receiving and processing a signal generated by a peripheral device that is separate from the electronic device 100.

The electronic device 100 may receive device type information associated with another electronic device (S620). For example, the device type information may indicate information associated with a device used in a specific place as an exclusive device or a desired (or, alternatively, predefined) device to perform a specific function such as a smart home hub, a navigation system, a dedicated speech recognizer, or a master device.

The electronic device 100 may determine priorities associated with the electronic device 100 and another electronic device based on the location information and the device type information associated with the electronic device 100 and another electronic device (S630).

For example, priorities based on the location and device type information may be predefined. For example, when the electronic device 100 is located in a vehicle, a priority associated with a dedicated vehicle device, for example, a navigation system, a built-in device for a smart car, or a dedicated speech recognizer may be set higher than those of other electronic devices, for example, mobile devices.

The electronic device 100 may compare the priority associated with the electronic device 100 with that of another electronic device (640). The electronic device 100 may deactivate a speech recognition functionality of the electronic device if the priority associated with the electronic device 100 is lower than that of another electronic device (650), and may activate the speech recognition functionality thereof if the priority associated with the electronic device 100 is higher than or the same as that of another electronic device (S660). For example, when the electronic device 100 is a smart phone and another electronic device is a navigation system, the electronic device 100 may deactivate the speech recognition functionality thereof based on a determination that the priority associated with the electronic device 100 is lower than that of the other electronic device.

After the speech recognition function is activated, the electronic device 100 may receive a voice input of a user and the speech recognition function may be triggered based on detection of a trigger word based on processing the voice input (S670). The electronic device 100 may continuously receive a voice input of a user, and may perform speech recognition and processing (S680).

Figure 10:
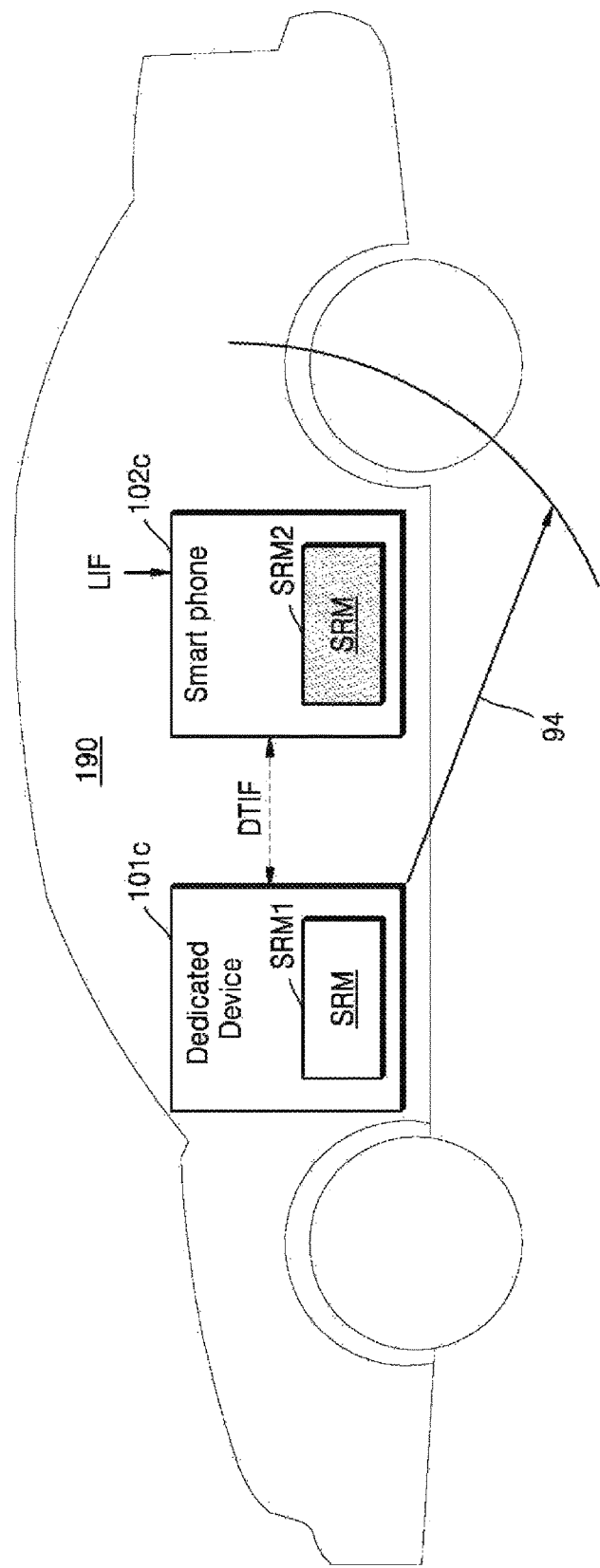
FIG. 10 is an example view for explaining an operation of an electronic device according to the operating method of FIG. 9.

FIG. 10 is an example view for explaining an operation of an electronic device according to the operating method of FIG. 9.

Referring to FIG. 10, a first electronic device 101c may be a dedicated vehicle device such as a navigation system, or a built-in device for a smart car, and a second electronic device 102c may be a mobile device such as a smart phone.

When a user is seated in a vehicle with a smart phone, the first and second electronic devices 101c and 102c may be located within a prescribed distance 94 of each other. The second electronic device 102c may obtain location information (LIF). For example, the second electronic device 102c may be sensed by a sensor 190 in the vehicle as being located in the vehicle. Alternatively, the second electronic device 102c may be sensed by a signal from an electronic device in the vehicle (e.g., the first electronic device 101c) as being located in the vehicle.

The first electronic device 101c may provide the second electronic device 102c with device type information (DTIF). In some example embodiments, when a new electronic device is sensed, the first electronic device 101c may provide DTIF to the sensed electronic device. For example, DTIF may be information about that the first electronic device 101c is a dedicated vehicle device, or a dedicated speech recognition device. The second electronic device 102c may determine that a priority associated with the second electronic device 102c is lower than that of the first electronic device 101c based on the LIF and the DTIF, and may deactivate the second speech recognition module SRM2.

According to some example embodiments, the first electronic device 101c may always activate the first speech recognition module SRM1 since the first electronic device 101c is a dedicated vehicle device. According to some example embodiments, the first electronic device 101c may receive DTIF from the second electronic device 102c and may determine a priority associated with the first electronic device 101c based on the DTIF. The first electronic device 101c may determine that the priority associated with the first electronic device 101c is higher than that of the second electronic device 102c, and may activate the first speech recognition module SRM1.

Figure 11:
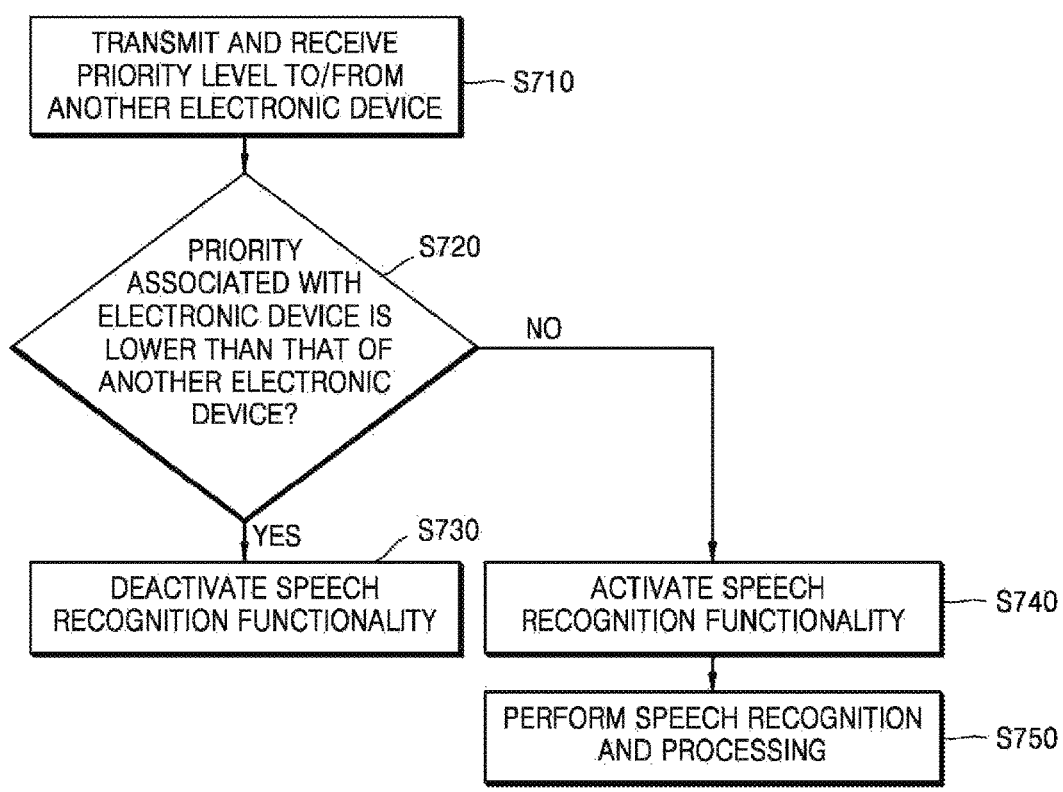
FIG. 11 is a block diagram of an operating method of an electronic device according to some example embodiments of the inventive concepts.

FIG. 11 is a block diagram of an operating method of the electronic device 100 according to some example embodiments of the inventive concepts. FIG. 11 illustrates a method of determining whether to activate or deactivate a speech recognition function by the electronic device 100 based on a predefined priority level.

Referring to FIG. 11, the electronic device 100 may transmit and receive information indicating one or more priority levels associated with one or more electronic devices to/from another electronic device (S710). Operation S710 of transmitting and receiving the priority level may be performed after the electronic device 100 and another electronic device are triggered based on processing a voice input of a user. Alternatively, the operation S710 may be periodically performed. The priority level may be associated with a type of an electronic device, a location of an electronic device, whether an electronic device is a dedicated device or not, or whether an electronic device is a wearable device or not. For example, a master device, a dedicated location device, a wearable device or a wired network connection device, and a general mobile device may be arranged in descending priority order. However, this is only an example and the priority order may be variously set.

The electronic device 100 may compare the priority level of the electronic device 100 with a received priority level (S720), may deactivate a speech recognition functionality of the electronic device 100 if the priority level of the electronic device 100 is lower than the received priority level (S730), and may activate the speech recognition functionality of the electronic device 100 if the priority level of the electronic device 100 is higher than the received priority level (S740).

When the speech recognition functionality of the electronic device 100 is activated (S740), the electronic device 100 may perform speech recognition and processing (S750). When operation S710 of transmitting and receiving the priority level is performed after the electronic device 100 and another electronic device are triggered based on processing the voice input of the user, the electronic device 100 may perform speech recognition and processing without obtaining an additional trigger word (S750). When operation S710 of transmitting and receiving the priority level is periodically performed, the electronic device 100 may perform the speech recognition and processing (S750) after receiving a voice input and being triggered by obtaining a trigger word from the received voice input.

Figure 12:
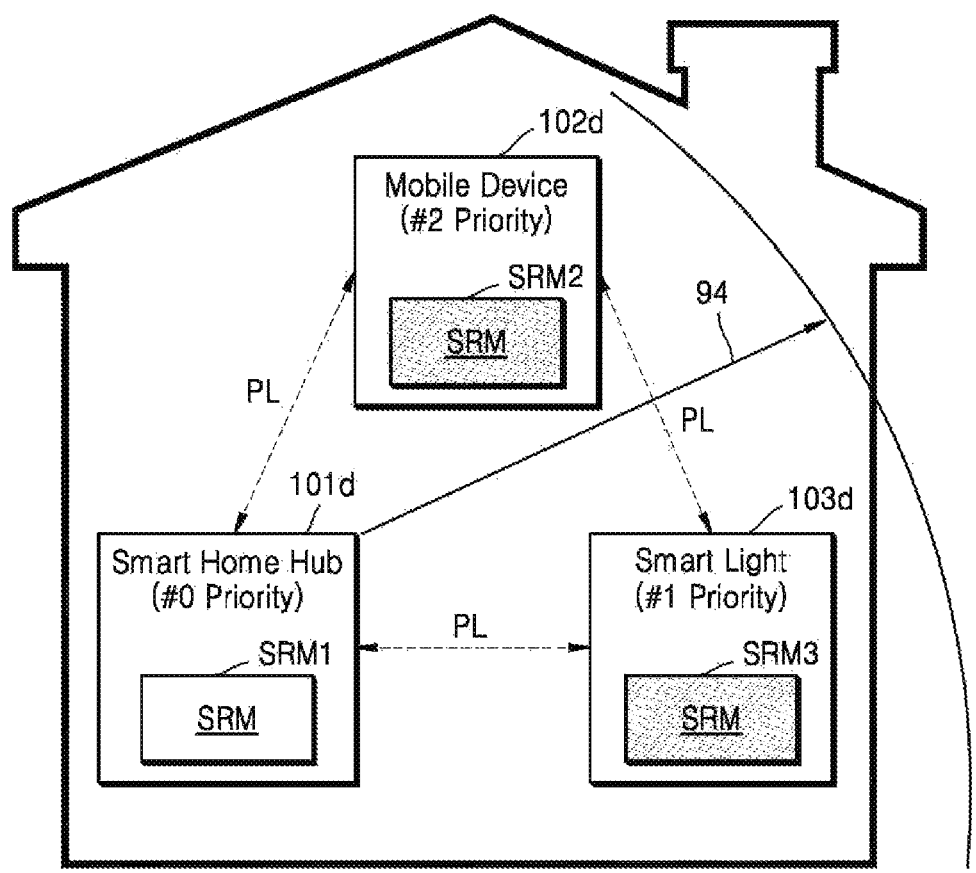
FIG. 12 is an example view for explaining an operation of another electronic device according to the operating method of FIG. 11.

FIG. 12 is an example view for explaining an operation of another electronic device according to the operating method of FIG. 11.

Referring to FIG. 12, in a building, first to third electronic devices 101d, 102d, and 103d respectively including speech recognition modules SRMs may be located within a prescribed distance 94 of each other (for example, a distance associated with the first to third electronic devices located within the distance of each other may be configured to recognize a voice input of a user and communicate with one another). For example, the first electronic device 101d may be a smart home hub, the second electronic device 102d may be a mobile device, and the third electronic device 103d may be a smart light. The smart home hub may be a dedicated location device or a device set as a master device at home. The smart light may be a wired network connection device.

The first to third electronic devices 101d, 102d, and 103d may have different priority levels, respectively. For example, a priority level of the first electronic device 101d may be '0', a priority level of the second electronic device 102d may be '2', and a priority level of the third electronic device 103d may be '1'. As described above with reference to FIG. 11, the priority levels of the master device and the dedicated location device may be relatively high, and that of the general mobile device may be relatively low. It may be determined that a priority is higher as a priority level is lower.

The first to third electronic devices 101d, 102d, and 103d may transmit and receive information indicating priority levels (PLs) associated with the first to third electronic devices 101d, 102d, and 103d to/from one another, respectively. Priorities associated with the first to third electronic devices 101d, 102d, and 103d may be compared with one another based on their respective associated priority levels and a received priority level (PL). The first speech recognition module SRM1 may be activated by determining that a priority associated with the first electronic device 101d is the highest of the priorities associated with the first to third electronic devices 101d, 102d, and 103d, respectively. The second and third speech recognition modules SRM2 and SRM3 may be respectively deactivated by determining that priorities associated with the second and third electronic devices 102d and 103d are lower than that of the first electronic device 101d. Later, each speech recognition module SRM of the second and third electronic devices 102d and 103d may be activated again based on a control command received from the first electronic device 101d (e.g., transmitted by the first electronic device 101d).

Figure 13:
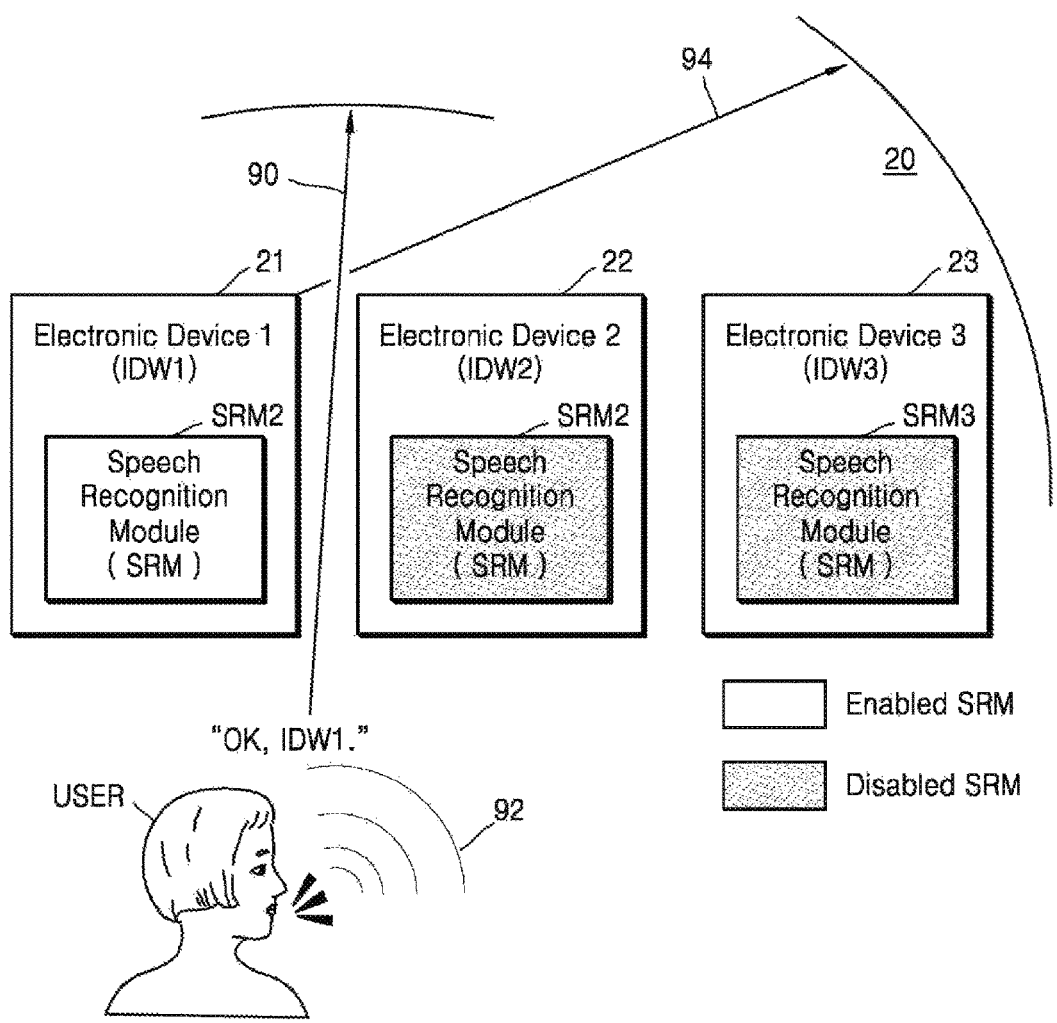
FIG. 13 is a block diagram of a speech recognition system according to some example embodiments of the inventive concepts.

FIG. 13 is a block diagram of a speech recognition system 20 according to some example embodiments of the inventive concepts. FIG. 13 is a variation of the speech recognition system of FIG. 1. The operating method of the electronic devices in the speech recognition system described above with reference to FIG. 1 may be applied to an operating method of electronic devices in the speech recognition system 20 of FIG. 13.

Referring to FIG. 13, the speech recognition system 20 may include first to third electronic devices 21, 22, and 23 respectively including speech recognition modules SRMs capable of recognizing a voice of a user, and the first to third electronic devices 21, 22, and 23 may be configured to detect a common trigger word, such that the first to third electronic devices 21, 22, and 23 may be triggered by the common trigger word. Furthermore, the first to third electronic devices 21, 22, and 23 may be associated with certain (or, alternatively, predefined) words, that is, predefined distinguished names IDW1, IDW2, and IDW3, respectively.

If no electronic device having speech recognition functionality is located within a prescribed distance 94, each of the first to third electronic devices 21, 22, and 23 may activate the speech recognition function in response to detecting a trigger word based on processing voice input from a user. In some example embodiments, if another electronic device having speech recognition functionality is located within a prescribed distance 94, each of the first to third electronic devices 21, 22, and 23 may activate the speech recognition functionality thereof in response to detecting a trigger word and a distinguished name in the voice input of the user.

For example, when a user says "OK, IDW1", the first speech recognition module SRM1 of the first electronic device 21 having IDW1 as a distinguished name may be activated, and the second and third speech recognition modules SRM2 and SRM3 of the second and third electronic devices 22 and 23 may be deactivated.

In some example embodiments, the predefined words may be product names of the first to third electronic devices 21, 22, and 23. In some example embodiments, the predefined words may be predefined nicknames. A user may set nicknames of the first to third electronic devices 21, 22, and 23. In some example embodiments, the predefined words may be words specifying some or all of the first to third electronic devices 21, 22, and 23. For example, when a user says "OK, all", "all" is a word specifying all of the first to third electronic devices 21, 22, and 23, and the first to third electronic devices 21, 22, and 23 may activate the first to third speech recognition modules SRM1 to SRM3.

Figure 14:
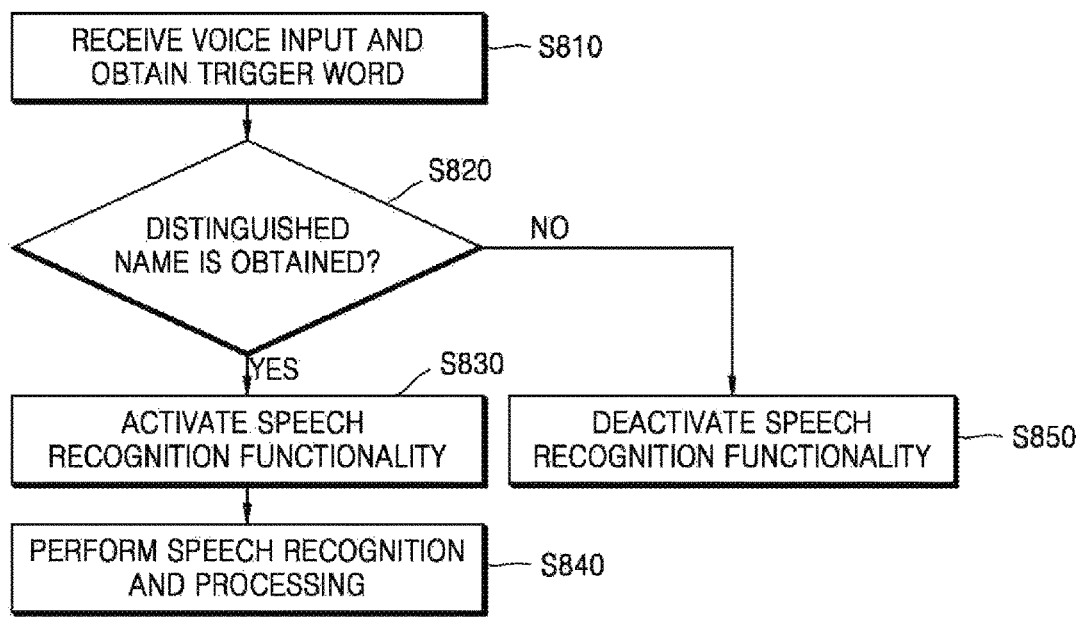
FIG. 14 is a flowchart illustrating an operating method of an electronic device having a speech recognition function, according to some example embodiments of the inventive concepts.

FIG. 14 is a flowchart illustrating an operating method of an electronic device having a speech recognition function, according to some example embodiments of the inventive concepts. FIG. 14 may be applied to the first to third electronic devices 21, 22, and 23 of FIG. 13. The descriptions with reference to FIG. 13 may be applied to the operating method of FIG. 14.

Referring to FIG. 14, for example, the electronic device 21 (of FIG. 13) may receive a voice input and may obtain ("detect," "identify," etc.) a trigger word based on processing the received voice input (S810). When the trigger word is obtained, the electronic device 21 may determine whether a distinguished name associated with the electronic device 21 is obtained from the received voice input, based on processing the voice input (S820). When the distinguished name is obtained, the electronic device 21 may activate a speech recognition functionality of the electronic device 21 (S830), and may perform speech recognition and processing (S840). When the distinguished name is not obtained, the electronic device 21 may deactivate the speech recognition functionality thereof (S850), since the voice input of a user may not be intended to be directed at the electronic device 21. The electronic device 21 may deactivate a speech recognition module of the electronic device 21. Furthermore, the electronic device 21 may deactivate a voice input device of the electronic device 21, for example, a microphone.

Figure 15:
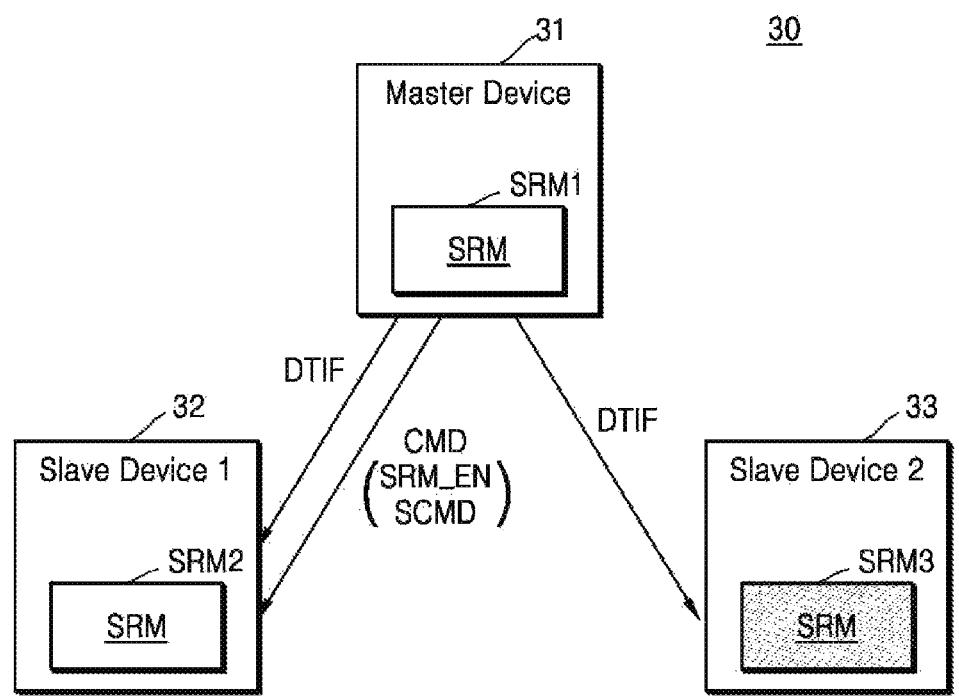
FIG. 15 is a block diagram of a speech recognition system according to some example embodiments of the inventive concepts.

FIG. 15 is a block diagram of a speech recognition system 30 according to some example embodiments of the inventive concepts. FIG. 15 is a variation of the speech recognition system of FIG. 1.

Referring to FIG. 15, the speech recognition system 30 may include first to third electronic devices 31, 32, and 33 respectively including the first to third speech recognition module SRMs configured to recognize a voice of a user based on processing a voice input provided by the user. One of the first to third electronic devices 31, 32, and 33, for example, the first electronic device 31 may be a master device, and the other electronic devices, for example, the second and third electronic devices 32 and 33 may be slave devices. The master device may be predefined. Hereinafter, the first electronic device 31 may be represented as a master device 31, the second electronic device 32 as a first slave device 32, and the third electronic device 33 as a second slave device 33.

The master device 31 may provide the first and second slave devices 32 and 33 with DTIF. The DTIF may be information indicating a master device. Each of the first and second slave devices 32 and 33 may receive DTIF from the master device 31, and may determine that each priority associated with the first and second slave devices 32 and 33 is lower than that of the master device 31. Each of the first and second slave devices 32 and 33 may deactivate a speech recognition function. The first slave device 32 may deactivate the second speech recognition module SRM2 and the second slave device 33 may deactivate the third speech recognition modules SRM3. In some example embodiments, the master device 31 may provide the first and second slave devices 32 and 33 with a control command that, when executed by the first and second slave devices, causes the first and second slave devices to deactivate a speech recognition functionality thereof (e.g., a deactivation command), and the first and second slave devices 32 and 33 may deactivate the speech recognition function in response to the received control command.

The master device 31 may activate the first speech recognition module SRM1. The master device 31 may perform speech recognition, may be operated, or may control the first and second slave devices 32 and 33 based on a voice command. The master device 31 may provide a various types of control command (CMD) to the first and second slave devices 32 and 33.

According to some example embodiments, the master device 31 may sense an action of a user corresponding to (associated with) at least one of the first and second slave devices 32 and 33 when receiving a voice input of the user, and may determine the slave device corresponding to the user action. The master device 31 may provide the slave device corresponding to the user action with a control command for activating a speech recognition functionality of the slave device. The slave device corresponding to the user action may receive the voice input of the user and may perform speech recognition and processing based at least in part upon the control command received from the master device 31.

For example, when the second slave device 33 is a smart refrigerator and a user opens the smart refrigerator saying "OK, where is an apple?", the master device 31 may receive a voice input of the user and may sense an action associated with the user. Furthermore, the master device 31 may determine that the user action corresponds to the second slave device 33. The master device 31 may provide the second slave device 33 with a control command for activating speech recognition functionality thereof, for example, speech recognition enable (SRM_EN) command. The first slave device 32 may activate the speech recognition functionality thereof and may obtain a voice command asking for a location of an apple from the voice input "where is an apple?" of the user. The first slave device 32 may process the voice command of the user by turning on a light-emitting diode (LED) lamp in the location of an apple.

According to some example embodiments, the master device 31 may perform speech recognition and may obtain a voice command (SCMD). Furthermore, the master device 31 may sense an action of a user corresponding to at least one of the first and second slave devices 32 and 33, and may determine the slave device corresponding to the user action. The master device 31 may provide the slave device corresponding to the user action with the voice command (SCMD). The slave device corresponding to the user action may perform an operation according to the voice command (SCMD). For example, in some example embodiments, the master device 31 may perform speech recognition corresponding to the voice input "OK, where is an apple?" of the user and may obtain a voice command. The master device 31 may provide the first slave device 32 with a voice command asking for a location of an apple. The first slave device 32 may turn on (e.g., supply at least a certain amount of electrical power to enable at least some functionality of) an LED lamp of where an apple is according to the voice command.

Figure 16:
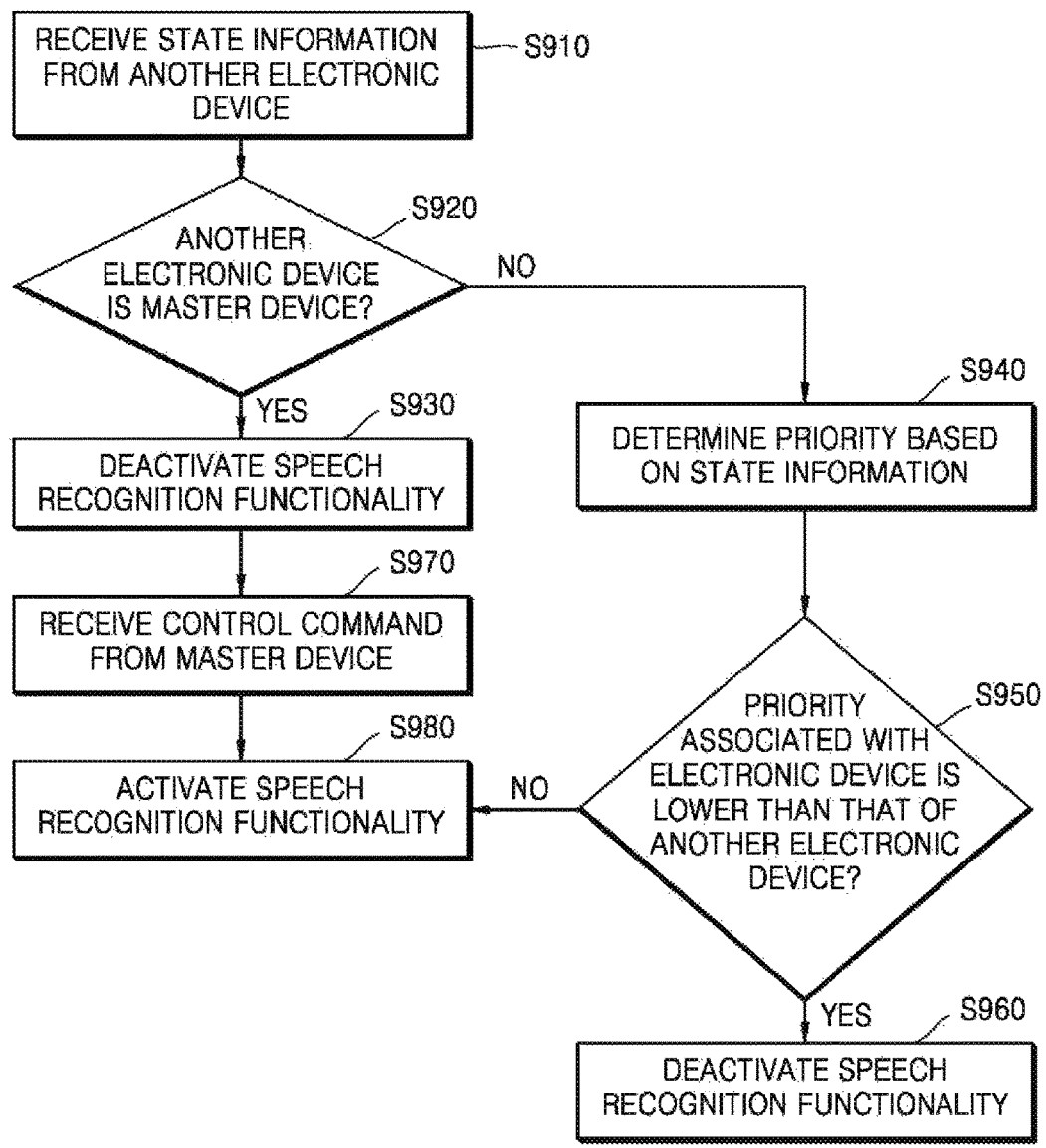
FIG. 16 is a flowchart illustrating an operating method of an electronic device having a speech recognition function, according to some example embodiments of the inventive concepts.

FIG. 16 is a flowchart illustrating an operating method of an electronic device having a speech recognition function, according to some example embodiments of the inventive concepts. FIG. 16 may be applied to the first and second slave devices 32 and 33 of FIG. 15. The descriptions with reference to FIG. 15 may be applied to the operating method of FIG. 16.

Referring to FIG. 16, for example, the electronic device 32 (of FIG. 15) may receive state information from another electronic device (S910). For example, the electronic device 32 may receive state information from a master device and another slave device.

The electronic device 32 may determine whether the other electronic device is a master device based on the state information associated therewith (S920). If the other electronic device is a master device, the electronic device 32 may deactivate a speech recognition functionality of the electronic device 32 (S930). If the another electronic device is not a master device, that is, if there is no master device from among other electronic devices, the electronic device 32 may determine a priority associated with one or more electronic devices based on the state information (S940), and may compare the priority associated with the electronic device 32 with that of another electronic device (S950). The electronic device 32 may deactivate a speech recognition functionality of the electronic device 32 if the priority associated with the electronic device 32 is lower than that of another electronic device (6960), and may activate the speech recognition functionality of the electronic device 32 if the priority associated with the electronic device 32 is higher than or the same as that of another electronic device (S980). The some example embodiments described above with reference to FIGS. 3 through 12 may be applied to a method of determining a priority.

Meanwhile, after the speech recognition functionality of the electronic device 32 is deactivated (S930), the electronic device 32 may activate the speech recognition functionality thereof again according to control of the master device. The electronic device 32 may receive a control command from the master device (S970). The control command may be a speech recognition enable-signal (e.g., an activation command). The electronic device 32 may activate a speech recognition functionality of the electronic device 32 in response to the control command (S980).

According to some example embodiments, the control command received from the master device may include a voice command. The electronic device 32 may perform an operation according to the voice command.

The operating methods of electronic devices according to the embodiments of the inventive concepts described above with reference to FIGS. 1 through 16 may be implemented as computer instructions which can be executed by various computer means, and recorded on a computer-readable medium. The computer-readable medium may include program commands, data files, data structures or a combination thereof. Program instructions recorded on the medium may be particularly designed and structured for the inventive concepts or may be available to those skilled in computer software. Examples of the computer-readable recording medium include magnetic media, such as a hard disc, a floppy disc, and a magnetic tape; optical media, such as a compact disc-read only memory (CD-ROM) and a digital versatile disc (DVD); magneto-optical media, such as floptical discs; a ROM; a RAM; and a flash memory. Program commands may include, for example, a high-level language code that can be executed by a computer using an interpreter, as well as a machine language code made by a complier.

Figure 17:
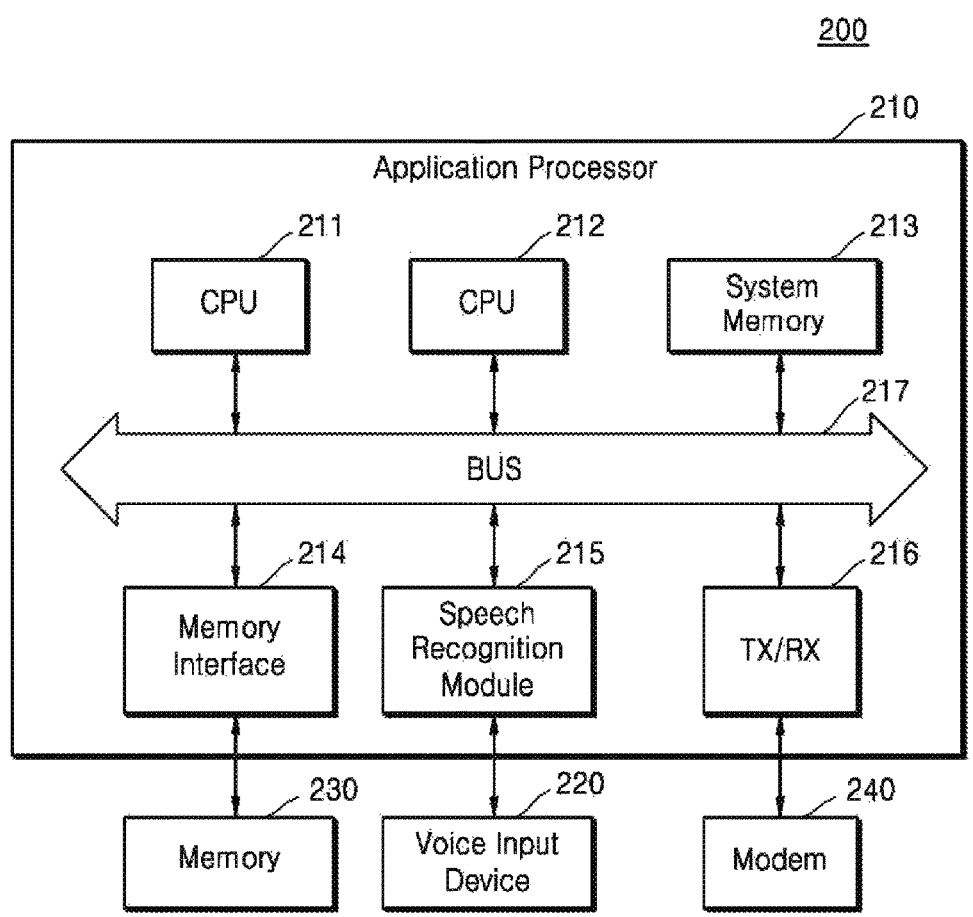
FIG. 17 is a block diagram illustrating a mobile device according to some example embodiments of the inventive concepts.

FIG. 17 is a block diagram illustrating a mobile device 200 according to some example embodiments of the inventive concepts.

Referring to FIG. 17, the mobile device 200 may include an application processor 210, a voice input device 220, a memory 230, and a modem 240.

The application processor 210 may control an operation required to be performed in the mobile device 200. The application processor 210 may include a CPU 211, a DSP 212, a system memory 213, a memory interface 214, a speech recognition module (SRM) 215, a communication interface 216, and a BUS 217 respectively electrically connecting them. According to some example embodiments, the application processor 210 may be realized as a system-on-chip (SoC).

The CPU 211 may perform an operation, data processing and control of the application processor 210. The DSP 212 may perform digital signal processing at a high speed, and may further perform some of the operation and data processing of the application processor 210. In some example embodiments, the CPU 211 or the DSP 212 may control activation or deactivation of the SRM 215. The CPU 211 or the DSP 212 may determine whether to activate or deactivate the SRM 215 based on each piece of state information associated with another electronic device and the mobile device 200.

The system memory 213 may load data required for performing the operations of the CPU 211. For example, the SRM 215 realized as an operating system (OS) or software may be loaded in the system memory 213. The system memory 213 may be realized as an SRAM, a DRAM, an MRAM, an FRAM, and an RRAM.

The memory interface 214 may provide an interface between the application processor 210 and the memory 230. Furthermore, the memory 230 may be used as an operation memory of the application processor 210. For example, data according to execution of an application may be loaded in the application processor 210. In some example embodiments, operating methods of electronic devices according to embodiments of the inventive concepts may be realized as a form of a program command and may be stored in the memory 230. The memory 230 may be realized as an SRAM, a DRAM, an MRAM, an FRAM, or an RRAM.

The SRM 215 may perform speech recognition corresponding to a voice input received from the voice input device 220. The SRM 215 may be activated or deactivated under the control of the CPU 211 or the DSP 212.

The SRM 215 is shown as a separate component in FIG. 17 but is not limited thereto, and may include hardware, software, firmware, or a coupling of software and hardware required for performing a speech recognition function. For example, the SRM 215 may be realized as a computer program code, or as a function of an operation processor performing a speech recognition algorithm, for example, as a function of a dedicated processor, the CPU 211, or the DSP 212.

The communication interface 216 may provide an interface between the application processor 210 and the modem 240. The modem 240 may support communication using at least one of various communication protocols such as Wi-Fi, LTE, bluetooth, RFID, IrDA, UWB, ZigBee, WFD, and NFC. The application processor 210 may communicate with another electronic device or system through the communication interface 216 and the modem 240. The application processor 210 may receive state information associated with another electronic device and transmit state information associated with the mobile device 200 from/to another electronic device or system through the communication interface 216 and the modem 240.

Figure 18:
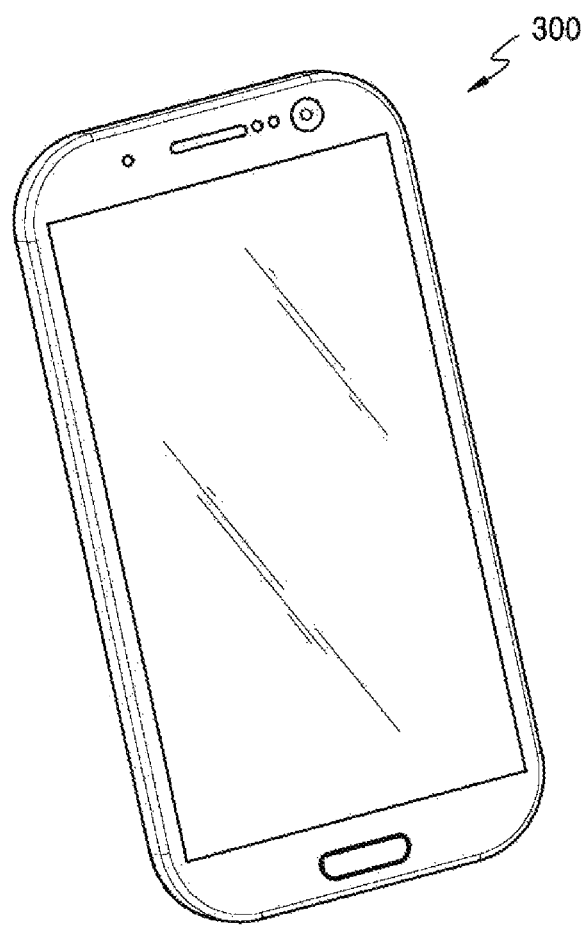
FIG. 18 and FIG. 19 are views illustrating embodiments of mobile devices according to some example embodiments of the inventive concepts.
Figure 19:
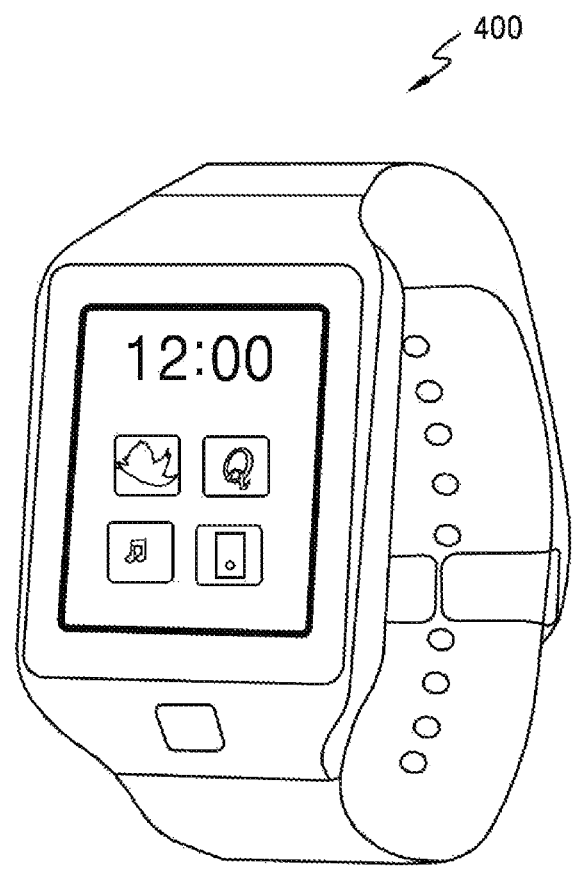

FIGS. 18 and 19 are views illustrating embodiments of electronic devices 300 and 400 according to some example embodiments of the inventive concepts.

Referring to FIG. 18, the electronic device 300 may be a smart phone. Referring to FIG. 19, the electronic device 400 may be a smart watch. The smart watch is a wearable device. The electronic devices 300 and 400 may perform a speech recognition function. When another electronic device having a speech recognition function is sensed within a prescribed distance, the electronic devices 300 and 400 may receive state information associated with another electronic device and may compare priorities of the electronic devices 300 and 400, which are related to the speech recognition function, based on the state information. The electronic devices 300 and 400 may activate or deactivate speech recognition modules therein based on a priority comparison result. The electronic devices 300 and 400 are mobile devices and locations of the electronic devices 300 and 400 may change according to a location of a user. Priorities of the electronic devices 300 and 400 may vary according to locations of the electronic devices 300 and 400. The electronic devices 300 and 400 of FIGS. 18 and 19 are mobile devices and may include the configuration of FIG. 17.

Figure 20:
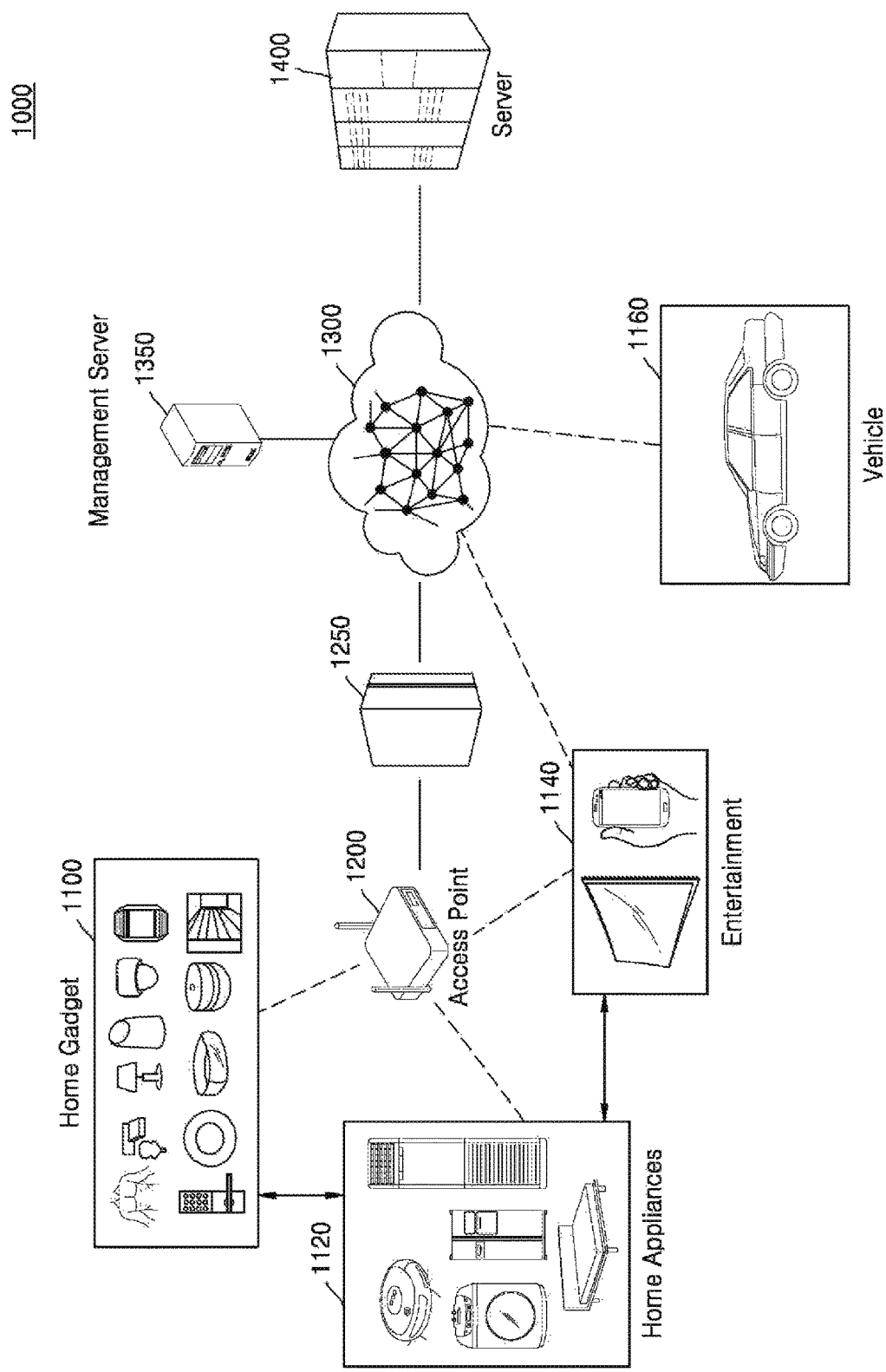
FIG. 20 is a view of an Internet of Things (IoT) network system according to some example embodiments of the inventive concepts.

FIG. 20 is a view of an Internet of Things (IoT) network system 1000 according to some example embodiments of the inventive concepts. The IoT network system 1000 of FIG. 20 may be applied to the speech recognition systems of FIGS. 1, 13 and 15. Referring to FIG. 20, the IoT network system 1000 may include a plurality of IoT devices 1100, 1120, 1140 and 1160.

IoT may indicate a network between things using wired and wireless communication. Therefore, IoT may be used in various terms such as an IoT network system, a ubiquitous sensor network (USN) communication system, a machine type communication (MTC) system, a machine oriented communication (MOC) system, a machine-to-machine (M2M) communication system, or a device-to-device (D2D) communication system. An IoT network system may be formed of an IoT device, an access point, a gateway, a communication network, and a server. These components are classified to describe the IoT network system, and do not limit a range of the IoT network system. Furthermore, the IoT network system may use a transmission protocol such as a user datagram protocol (UDP) or a transmission control protocol (TCP), and an application protocol such as an IPv6 low-power wireless personal area networks (6LoWPAN) protocol, an IPv6 Internet routing protocol, a constrained application protocol (CoAP), a hypertext transfer protocol (HTTP), a message queue telemetry transport (MQTT) protocol, or an MQTT protocol for sensors networks (MQTT-S) to exchange (communicate) information between at least two components in the IoT network system.

Each of the IoT devices 1100, 1120, 1140, and 1160 may be used as a sink node or a sensor node in a wireless sensor network (WSN). The sink node, which is also represented as a base station, may play a role as a gateway connecting the WSN and an external network (for example, Internet), may assign a task to each sensor node, and may gather events sensed by each sensor node. The sensor node may be a node in the WSN capable of processing and gathering sensory information, and may be a node capable of performing communication between nodes connected to each other in the WSN.

The IoT devices 1100, 1120, 1140, and 1160 may include an active IoT device operated based on an internal power source and a passive IoT device operated based on external power received wirelessly from the outside. The active IoT device may include a refrigerator, an air conditioner, a telephone, or a vehicle. The passive IoT device may include an RFID tag or an NFC tag.

Alternatively, the IoT devices 1100, 1120, 1140, and 1160 may include a passive communication interface such as a quick response (QR) code, an RFID tag, or an NFC tag, or may include an active communication interface such as a modem, or a transceiver.

The IoT devices 1100, 1120, 1140, and 1160 may gather data by using a sensor, or may transmit the gathered data, for example, state information to outside through a wired and wireless communication interface. Furthermore, the IoT devices 1100, 1120, 1140, and 1160 may transmit and/or receive control information and/or data to/or from external devices through the wired and wireless communication interface.

At least one of the IoT devices 1100, 1120, 1140, and 1160 may include the electronic device according to the embodiments of the inventive concepts described above with reference to FIGS. 1 through 19, and may perform the operating method according to the embodiments of the inventive concepts. An IoT device applying the electronic device or the electronic system according to the embodiments of the inventive concepts may include an speech recognition module, may receive state information associated with another electronic device performing a speech recognition function or the IoT device, and may determine whether the speech recognition module is activated or not based on the state information.

Meanwhile, each of the IoT devices 1100, 1120, 1140, and 1160 may form a group according to characteristics thereof. For example, each of the IoT devices may be grouped into a home gadget group 1100, a household appliances/furniture group 1120, an entertainment group 1140, or a vehicle group 1160. Furthermore, each of the IoT devices may form a temperature control group controlling indoor temperature, a large household appliances group or a small household appliances group divided by power consumption, a cleaning group controlling indoor cleaning (for example, air purifying and floor cleaning), a lighting group controlling indoor lighting, or the entertainment group 1140 controlling an entertainment device (for example, a television (TV), an audio device, etc.). The temperature control group may include an air-conditioner, an electric window, or an electric curtain. For example, the home gadget group 1100 may include a heart-rate sensor patch, a medical device for blood sugar measurement, a lighting device, a hygrometer, a surveillance camera, a smart watch, a security keypad, a temperature adjusting device, a direction device, or a window blind. The household appliances/furniture group 1120 may include household appliances such as a robot cleaner, a washing machine, a refrigerator, an air-conditioner, a TV, or furniture such as a bed including a sensor. The entertainment group 1140 may include a multimedia imaging device and a communication device such as a TV and a smart phone.

Each of the IoT devices may be included in a plurality of groups. For example, an air-conditioner may be included in the large household appliances/furniture group 1120 and the temperature control group, and a TV may be included in the household appliances/furniture group 1120 and the entertainment group 1140. Furthermore, a smart phone may be included in the home gadget group 1100 and the entertainment group 1140.

The IoT network system 1000 may further include an access point 1200. The IoT devices 1100, 1120, and 1140 may be connected to a communication network or another IoT device through the access point 1200. The access point 1200 may be built in one of the IoT devices. For example, the access point 1200 may be built in a TV. A user may monitor or control at least one IoT device connected to the access point 1200 through a display of the TV. Furthermore, the access point 1200 may be included in one of the IoT devices. For example, a mobile phone may be an IoT device and may be the access point 1200 connected to another IoT device, simultaneously. The mobile phone may be connected to a communication network through a mobile cellular network or a local area wireless network.

The IoT network system 1000 may further include a gateway 1250. The gateway 1250 may change a protocol so that the access point 1200 may be connected to an external communication network (for example, an internet network or a public communication network). The IoT devices 1100, 1120, and 1140 may be connected to the external communication network through the gateway 1250. In some cases, the gateway 1250 may be integrated to the access point 1200. In other cases, the access point 1200 may perform a function of a first gateway and the gateway 1250 may perform a function of a second gateway.

The gateway 1250 may be included in one of the IoT devices. For example, a mobile phone may be an IoT device and may be the gateway 1250 connected to another IoT device, simultaneously. The mobile phone may be connected to a mobile cellular network.

The IoT network system 1000 may further include at least one communication network 1300. The communication network 1300 may include Internet and/or a public communication network. The public communication network may include a mobile cellular network. The communication network 1300 may be a channel to which information gathered from the IoT devices 1100, 1120, 1140, and 1160 is transmitted.

The IoT network system 1000 may further include a server 1400 connected to the communication network 1300. The communication network 1300 may transmit data sensed in the IoT devices 1100, 1120, 1140, and 1160 to the server 1400. The server 1400 may analyze or store the transmitted data. Furthermore, the server 1400 may transmit the analyzed result to the IoT devices 1100, 1120, 1140, and 1160 through the communication network 1300. The server 1400 may store information related to at least one of the IoT devices 1100, 1120, 1140, and 1160, and may analyze data transmitted from the related IoT device based on the stored information. Furthermore, the server 1400 may transmit the analyzed result to the related IoT device or a user device through the communication network 1300. For example, in a case of an IoT device measuring blood sugar of a user in real time, the server 1400 may store a limit value of blood sugar set in advance by a user, and may receive the measured blood sugar through the communication network 1300. The server 1400 may compare the limit value of blood sugar with the measured blood sugar value and may transmit to the user device and/or the related IoT device that the measured blood sugar value is at a dangerous level or not.

While the inventive concepts has been particularly shown and described with reference to embodiments thereof, it will be understood that various changes in form and details may be made therein without departing from the spirit and scope of the following claims.

What is claimed is:

1. An operating method, performed by an electronic device, the operating method comprising:
   receiving state information associated with at least one other electronic device, the at least one other electronic device configured to perform speech recognition based on processing audio inputs received at the at least one other electronic device, the state information indicating a priority associated with the at least one other electronic device;
   comparing a priority associated with the electronic device with the priority associated with the at least one other electronic device, based on receiving the received state information;
   activating a speech recognition functionality of the electronic device, such that the electronic device is enabled to perform speech recognition in response to processing audio inputs received at the electronic device, based on a determination that the priority associated with the electronic device is higher than the priority associated with the at least one other electronic device;
   deactivating a speech recognition functionality of the at least one other electronic device, such that the at least one other electronic device is inhibited from performing speech recognition in response to processing audio inputs received at the electronic device, based on a determination that the priority associated with the electronic device is higher than that of the at least one other electronic device;
   receiving an audio input and determining that the audio input corresponds to the at least one other electronic device; and
   providing the at least one other electronic device with a control command signal to cause the at least one other electronic device to reactivate the speech recognition functionality of the at least one other electronic device to configure the at least one other electronic device to process the audio input to perform an action, in response to the determination that the audio input corresponds to the at least one other electronic device.

2. The operating method of claim 1, further comprising:
   receiving an audio input that includes a voice input;
   recognizing the voice input in the received audio input; and
   processing the voice input.

3. The operating method of claim 1, wherein
   the deactivating of the speech recognition functionality includes turning off a portion of the at least one other electronic device configured to perform speech recognition based on processing audio inputs received at the at least one other electronic device.

4. The operating method of claim 1, wherein,
   the state information includes at least one of, wired and wireless network connection information associated with the at least one other electronic device, user connection information associated with the at least one other electronic device, device type information associated with the at least one other electronic device, operating state information associated with the at least one other electronic device, and priority information associated with the at least one other electronic device.

5. The operating method of claim 1, wherein, the priority associated with the electronic device associated with at least one of a wired and wireless network type associated with the electronic device, a device type associated with the electronic device, an operating state associated with the electronic device, and a geographic location of the electronic device.

6. The operating method of claim 1, wherein, the priority associated with the electronic device is configured to vary according to a change in an operating state associated with the electronic device or a change in a location of the electronic device.

7. The operating method of claim 1, further comprising:

transmitting state information associated with the electronic device to the at least one other electronic device, and periodically performing the transmitting and receiving of the state information.

8. The operating method of claim 1, further comprising:

performing an operation according to a control command from the at least one other electronic device.

9. The operating method of claim 1, wherein the deactivating includes, transmitting a deactivation command to the at least one other electronic device to cause the at least one other electronic device to deactivate the speech recognition functionality of the at least one other electronic device, based on the deactivation command.

10. A non-transitory computer-readable recording medium having recorded thereon a program that, when executed by a processor, causes the processor to execute the operating method of claim 1.

11. An electronic device, comprising:

a communication interface configured to receive state information associated with another electronic device having speech recognition functionality;

a memory storing program instructions; and a processor configured to execute the program instructions to, perform speech recognition based on processing an audio input received at the electronic device, determine a priority associated with the other electronic device based on the received state information, activate a speech recognition functionality of the electronic device, such that the electronic device is enabled to perform speech recognition in response to processing audio inputs received at the electronic device, based on a determination that a priority associated with the electronic device is higher than the priority associated with the other electronic device; and deactivate the speech recognition functionality of the other electronic device, such that the other electronic device is inhibited from performing speech recognition in response to processing audio inputs received at the electronic device, based on the determination that the priority associated with the electronic device is higher than that of the other electronic device;

receive an audio input and determining that the audio input corresponds to the other electronic device; and provide the other electronic device with a control command signal to cause the other electronic device to reactivate the speech recognition functionality of the other electronic device to configure the other electronic device to process the audio input to perform an action, in response to the determination that the audio input corresponds to the other electronic device.

12. The electronic device of claim 11, wherein, the processor is configured to execute the program instructions to determine the priority associated with the electronic device based on state information associated with the electronic device; and the state information associated with the electronic device includes at least one of, wired and wireless network connection information associated with the electronic device, user connection information associated with the electronic device, device type information associated with the electronic device, operating state information associated with the electronic device, predefined priority information associated with the electronic device, and location information associated with the electronic device.

13. A method, comprising:

determining a first priority value associated with a first electronic device and a second priority value associated with a second electronic device, each of the first electronic device and the second electronic device configured to perform speech recognition based on processing audio inputs received at the first electronic device and the second electronic device, respectively;

selectively activating a speech recognition functionality of the first electronic device, such that the first electronic device is enabled to perform speech recognition in response to processing audio inputs received at the first electronic device, based on the determination that the first priority is higher than the second priority;

selectively deactivating a speech recognition functionality of second electronic device, such that the second electronic device is inhibited from performing speech recognition in response to processing audio inputs received at the second electronic device, based on the determination that the priority associated with the first electronic device is higher than that of the second electronic device;

receiving an audio input and determining that the audio input corresponds to the second electronic device; and providing the second electronic device with a control command signal to cause the second electronic device to reactivate the speech recognition functionality of the second electronic device to configure the second electronic device to process the audio input to perform an action, in response to the determination that the audio input corresponds to the second electronic device.

14. The method of claim 13, wherein, deactivating the speech recognition functionality of the second electronic device includes turning off a portion of the second electronic device configured to perform speech recognition based on processing audio inputs received at the first electronic device.

15. The method of claim 13, wherein the first priority value is determined based on at least one of,
- a wired and wireless network type associated with the first electronic device,
- a device type associated with the first electronic device,
- an operating state associated with the first electronic device, and
- a geographic location of the first electronic device.

16. The method of claim 13, wherein,
the first priority value associated with the first electronic device is configured to vary according to a change in an operating state associated with the first electronic device or a change in a location of the first electronic device.

\* \* \* \* \*